(12) United States Patent
McGill

(10) Patent No.: US 8,950,422 B2
(45) Date of Patent: Feb. 10, 2015

(54) ACTUATING MECHANISM FOR A VALVE AND AN ELECTRIC SWITCH HAVING AN ACTUATOR

(76) Inventor: James C. McGill, Union City, CA (US)

( * ) Notice: Subject to any disclaimer, the term of this patent is extended or adjusted under 35 U.S.C. 154(b) by 384 days.

(21) Appl. No.: 13/281,812

(22) Filed: Oct. 26, 2011

(65) Prior Publication Data

US 2013/0104999 A1    May 2, 2013

(51) Int. Cl.
*F16K 17/36*  (2006.01)
*F16K 31/08*  (2006.01)
*F16K 31/56*  (2006.01)

(52) U.S. Cl.
CPC ............. *F16K 31/563* (2013.01); *F16K 17/363* (2013.01)
USPC ........................ 137/238; 251/213; 251/129.01

(58) Field of Classification Search
USPC ................................. 137/38; 251/213, 129.01
See application file for complete search history.

(56) References Cited

U.S. PATENT DOCUMENTS

| | | |
|---|---|---|
| 1,971,731 A | 8/1934 | Ramseur |
| 3,783,887 A | 1/1974 | Shoji |
| 3,791,396 A | 2/1974 | Nelson |
| 4,161,183 A | 7/1979 | Berry |
| 4,165,758 A | 8/1979 | Douce |
| 4,429,704 A | 2/1984 | Jones |
| 4,542,760 A | 9/1985 | Flauiani |
| 4,546,660 A | 10/1985 | Bujold |
| 4,688,592 A | 8/1987 | Tibbals, Jr. |
| 4,742,839 A | 5/1988 | Stock |
| 4,821,759 A | 4/1989 | Diamond |
| 4,860,780 A | 8/1989 | Fisher |
| 4,889,313 A | 12/1989 | Sanchez |
| 4,903,720 A | 2/1990 | McGill |
| 4,911,029 A | 3/1990 | Banba et al. |
| 5,048,552 A | 9/1991 | Bourne |
| 5,050,629 A | 9/1991 | Willoughby |
| 5,351,706 A | 10/1994 | Banks |
| 5,721,425 A | 2/1998 | Merrill |
| 5,787,917 A | 8/1998 | Park et al. |
| 5,992,439 A | 11/1999 | McGill |

(Continued)

FOREIGN PATENT DOCUMENTS

| | | |
|---|---|---|
| JP | 55-72968 | 6/1980 |
| JP | 56-28367 | 3/1981 |
| JP | 58-72778 | 4/1983 |

OTHER PUBLICATIONS

English Abstract for Japanese Patent Application Publication 56-150679, published Nov. 21, 1981.

(Continued)

*Primary Examiner* — Kevin Lee
(74) *Attorney, Agent, or Firm* — Wenderoth, Lind & Ponack, L.L.P.

(57) ABSTRACT

A valve actuating mechanism has an actuator housing and an actuator drive. A spring is connected between them so that when the actuator drive is in a lock position, the spring biases the actuator drive toward an unlock position. A locking member is movable from a first position received in a locking aperture of the actuator drive and in a hole in the actuator housing so as to hold the actuator drive relative to the housing in the locking position and to a second position in which the locking member is outside of the locking aperture so that the spring can move the actuator drive to the unlocked position. A blocking device blocks movement of the locking member but can release the locking member to allow the actuator drive to turn.

24 Claims, 22 Drawing Sheets

(56) References Cited

U.S. PATENT DOCUMENTS

| | | | |
|---|---|---|---|
| 6,085,772 A | 7/2000 | McGill et al. | |
| 6,112,764 A * | 9/2000 | Engdahl et al. | 137/38 |
| 6,705,340 B1 | 3/2004 | McGill et al. | |
| 6,899,122 B1 | 5/2005 | Mele | |
| 6,938,637 B2 | 9/2005 | McGill et al. | |
| 7,458,387 B2 | 12/2008 | McGill | |
| 7,650,905 B2 | 1/2010 | Kubota et al. | |
| 7,814,924 B2 | 10/2010 | McGill | |
| 2009/0065068 A1 | 3/2009 | McGill | |

OTHER PUBLICATIONS

English Abstract for Korean Patent Application Publication 20010008022, published Feb. 5, 2001.

"Emergency Shut-Off Valve", Quake Pro, http://www.quakepro.com/valve.htm, Nov. 9, 2010, pp. 1-4.

* cited by examiner

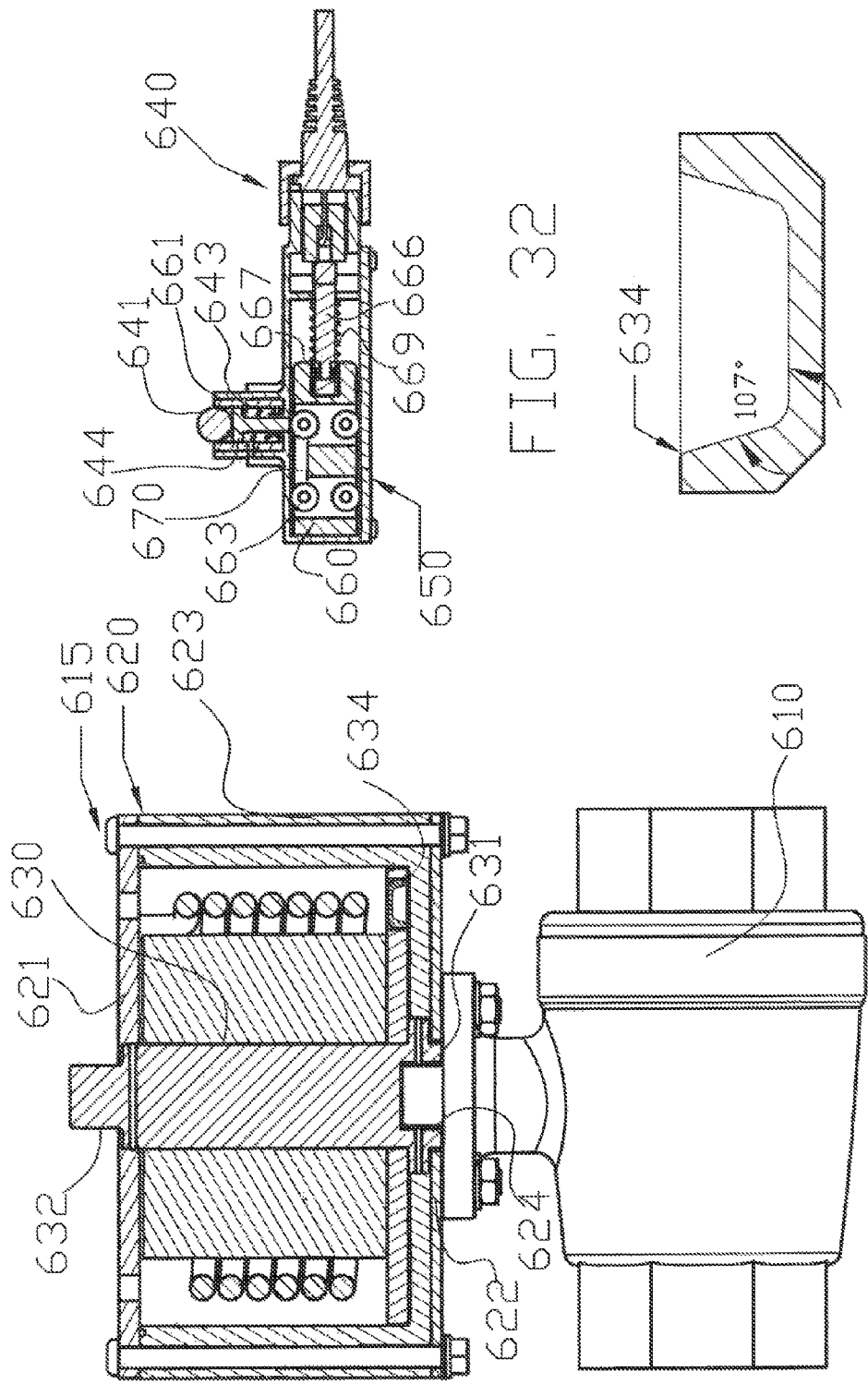

ACTUATING MECHANISM FOR A VALVE AND AN ELECTRIC SWITCH HAVING AN ACTUATOR

BACKGROUND OF THE INVENTION

1. Field of the Invention

The field of this invention relates to earthquake safety technology, and more specifically to actuating mechanisms for actuating a valve or an electric switch in response to seismic activity.

2. State of the Prior Art

Seismic safety valves are known. The present inventor is also the inventor of the following patents and applications related to seismic safety technology, all of which are incorporated herein by reference:

U.S. Pat. No. 4,903,720;
U.S. Pat. No. 5,992,439;
U.S. Pat. No. 6,085,772;
U.S. Pat. No. 6,705,340;
U.S. Pat. No. 6,938,637;
U.S. Pat. No. 7,458,387;
U.S. Pat. No. 7,814,924; and
U.S. Patent Publication No. 2009/0065068.

Each of U.S. Pat. Nos. 4,911,029, 4,161,183, 4,821,759 and 4,429,704 includes the concept of a quarter turn valve that is turned by a spring loaded actuator to shut off the flow of, for example, gas, in response to an emergency condition such as a seismic event. Each includes some form of sensor to release the spring to cause the valve to turn.

In particular, U.S. Pat. No. 4,429,704 has a housing with a built in rotor with a spring loaded to turn one quarter turn to shut off the valve upon the occurrence of a seismic event. A latch element maintains the rotor in place until the seismic event happens. The sensor is a pendulum device that allows the latch to move under force of the spring.

U.S. Pat. No. 4,911,029 uses a ball and pedestal as a sensor to mechanically release a spring loaded actuator. The springs drive a rack which turns a pinion which turns a valve. This arrangement is quite complicated, and involves a clutch mechanism for the purpose of resetting the device.

U.S. Pat. No. 4,161,183 uses a ball and a spring loaded cylinder to turn the valve stem and has a complicated release mechanism. An arm 54 pivots about point 57 when the ball moves arm 75 to release arm 54 and thus arm 28. Arm 28 is connected to a spring loaded cylinder.

U.S. Pat. No. 4,821,759 has a spring loaded valve. A handle or bar 14 is prevented from releasing by a detent ball member 82. This is released upon a seismic event through a sensor mechanism.

U.S. Pat. No. 4,546,660 addresses the concept of actuating a standard valve.

SUMMARY OF THE INVENTION

The present inventor has recognized a need in the field for an actuator for shutting off a valve in response to seismic activity. While such are known, as demonstrated by the above patents, there nonetheless remains a need for an actuator that can be easily and simply mounted on existing off-the-shelf valves, that is simple in structure, reliable, rugged and easy to manufacture.

To this end, the present inventor has developed an actuating mechanism for actuating a valve that includes an actuator housing and an actuator drive in the housing that is movable relative to the housing between a locked position and an unlocked position. The actuator drive has a valve connection for connecting the actuator drive to a valve. A spring is either part of the valve, or is connected between the actuator housing and the actuator drive such that, when the actuator drive is in the locked position, the spring biases the actuator drive toward the unlocked position.

A locking aperture is provided in the actuator drive and a hole is provided in the actuator housing. A locking member has a first position in which the locking member is received in both the locking aperture and in the hole so as to hold the actuator drive relative to the actuator housing in a locked position. It can move to a second position in which the locking member is outside of the locking aperture so that the spring can move the actuator drive to the unlocked position, moving the drive and thus closing the valve.

A locking member blocking device is further provided so as to be movable between a position blocking movement of the locking member from the locking aperture and a position allowing the locking member to move from the aperture.

The actuator housing has a valve mount for mounting the actuating mechanism on a mounting flange of a standard off-the-shelf valve. The valve connection can, for example, comprise a drive socket for connection to a valve stem shaft.

Preferably the actuator drive comprises a rotor mounted in the housing.

Preferably the locking aperture has an angled surface that receives the locking ball. The angled surface should have an angle of 15 to 35° relative to the direction of movement into the hole of the housing, and more preferably 18 to 20°.

In a preferred embodiment of the invention, the locking member comprises a locking ball and a locking pin adjacent the locking ball. The locking ball is restrained by the blocking member, and the locking pin also engages the locking ball, so that upon movement of the blocking device from blocking the locking member, the ball is moved into the hole and the pin moves with the ball. The blocking device preferably comprises a roller arrangement mounted for rolling movement.

The blocking device is connected to a sensor mechanism. The sensor mechanism preferably comprises a seismic sensor that is operable to detect seismic activity. The sensor mechanism is connected to the roller arrangement by a cable so that when seismic activity is detected the roller arrangement is moved by the cable to the position unblocking the through hole. The roller arrangement preferably comprises a roller housing on the actuator housing and a slider having a plurality of rollers that are mounted thereon for rolling movement in the roller housing. One of the rollers preferably engages the locking pin in the position in which the blocking device blocks the hole.

Preferably the locking aperture of the actuator drive is formed by a separate locking insert that is mounted in a hole in the actuator drive. This allows the angled surface to be formed in a separate component, allowing the surface to be more easily formed.

Preferably the locking insert has a reset magnet that is mounted therewith for attracting the locking ball into the aperture when the actuator drive is reset to the locking position. The locking ball is thus preferably made of steel.

In one preferred embodiment of the sensor, the sensor comprises a sensor housing that has a ball track therein. A steel ball is provided on a pedestal in the housing, and a magnet is positioned for movement at a location along the ball track that is remote from the pedestal. The magnet is connected to the cable so that when the steel ball is on the pedestal, and seismic activity causes the steel ball to leave the pedestal, the steel ball moves to a position along the ball track such that the magnet is attracted thereto and causes the cable to be pulled.

In an alternative of the sensor mechanism, the sensor may include a solenoid and a solenoid pin movable by the solenoid. The solenoid is then operably connected to a control system that comprises at least one sensor for detecting a safety condition.

In accordance with another aspect of the present invention, an electric switch is provided having a seismic actuator. A mechanical sensor is operable to detect seismic activity, the mechanical sensor comprising a steel ball that is movable between an unactivated position and an activated position. An electric switch has two contacts and a contact link that is movable between an unactivated position in which the contact link electrically connects the two contacts and an activated position in which the contact link does not electrically connect the two contacts. A magnet is connected to the contact link and located so that the magnet is attracted to and movable by the steel ball when the steel ball is in the activated position.

With the above arrangement for an actuating mechanism for actuating a valve, a simple, rugged and durable actuating mechanism is provided that can be fitted to standard off-the-shelf valves. Further, the actuating mechanism allows for a relatively small force to activate a relatively large force for closing the valve upon detection of, e.g., seismic activity.

A sensor mechanism can also be adapted to an electric switch allowing an electric switch to be shut off in the case of detection of seismic activity.

BRIEF DESCRIPTION OF THE DRAWINGS

FIG. 31 is a partly cross-sectional view illustrating actuating components of this embodiment;

FIG. 32 is a cross-sectional view of a release mechanism according to the embodiment of FIG. 30;

FIG. 33 is a cross-sectional view of a locking insert for use with the embodiment of FIG. 30;

DETAILED DESCRIPTION OF THE PREFERRED EMBODIMENTS

Figure 1:
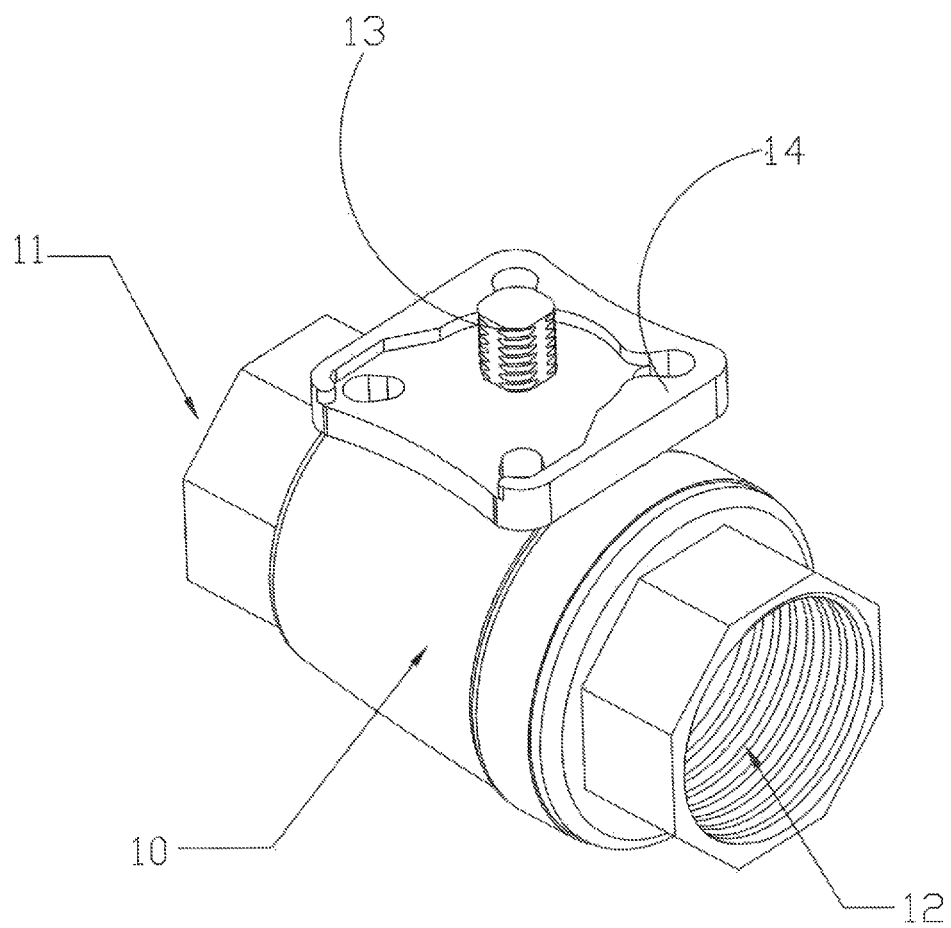
FIG. 1 is a perspective view of a known standard ¼ turn valve.

FIG. 1 illustrates an example of a standard off-the-shelf ¼ turn valve; the structure and operation of this type of ¼ turn valve is generally known. The valve, designated by reference number 10, includes an inlet 11, an outlet 12, a ¼ turn square shaft 13 and a standard mounting flange 14. As noted above, an object of this invention is to provide an actuating mechanism that can be readily mounted to the valve 10 for operation of the valve upon detection of a desired shut off condition, such as a seismic event.

It should be noted that while a specific embodiment of the present invention is directed toward the detection of seismic activity, controls and sensors other than seismic sensors could be used to activate the actuating mechanism. For example, a sensor such as a carbon monoxide sensor or a fire detection sensor could also be used to activate the actuating mechanism.

Figure 2:
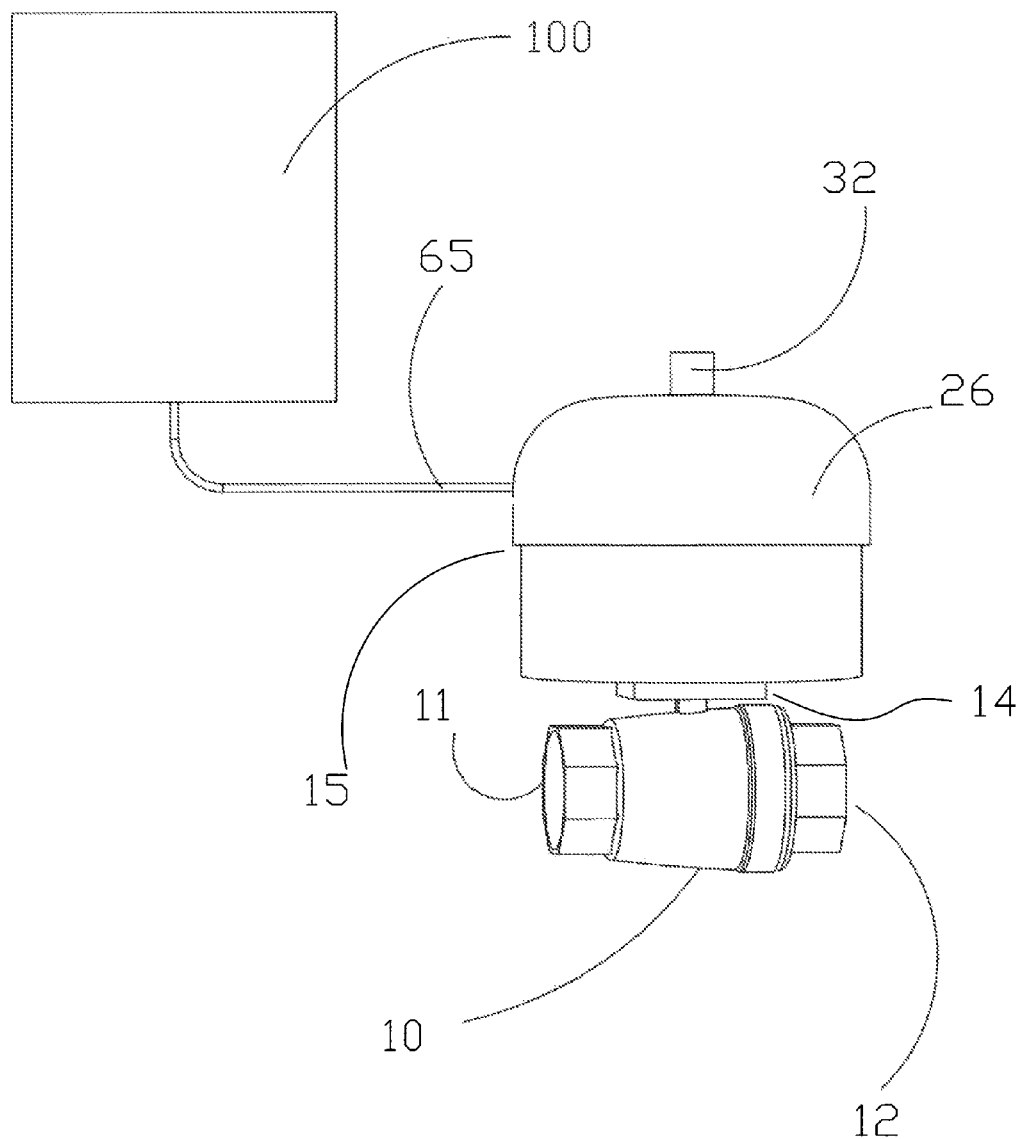
FIG. 2 is a schematic illustration of an actuating mechanism in accordance with the present invention together with a standard ¼ turn valve.

The schematic illustration of FIG. 2 shows an actuator 15 according to the present invention positioned on a mounting flange 14 of the valve 10. A release cable connects the actuator 15 to a motion sensor 100. Thus, the basic operation of the present invention is that, when the motion sensor 100 detects seismic activity, the release cable 65 activates actuator 15.

Figure 3:
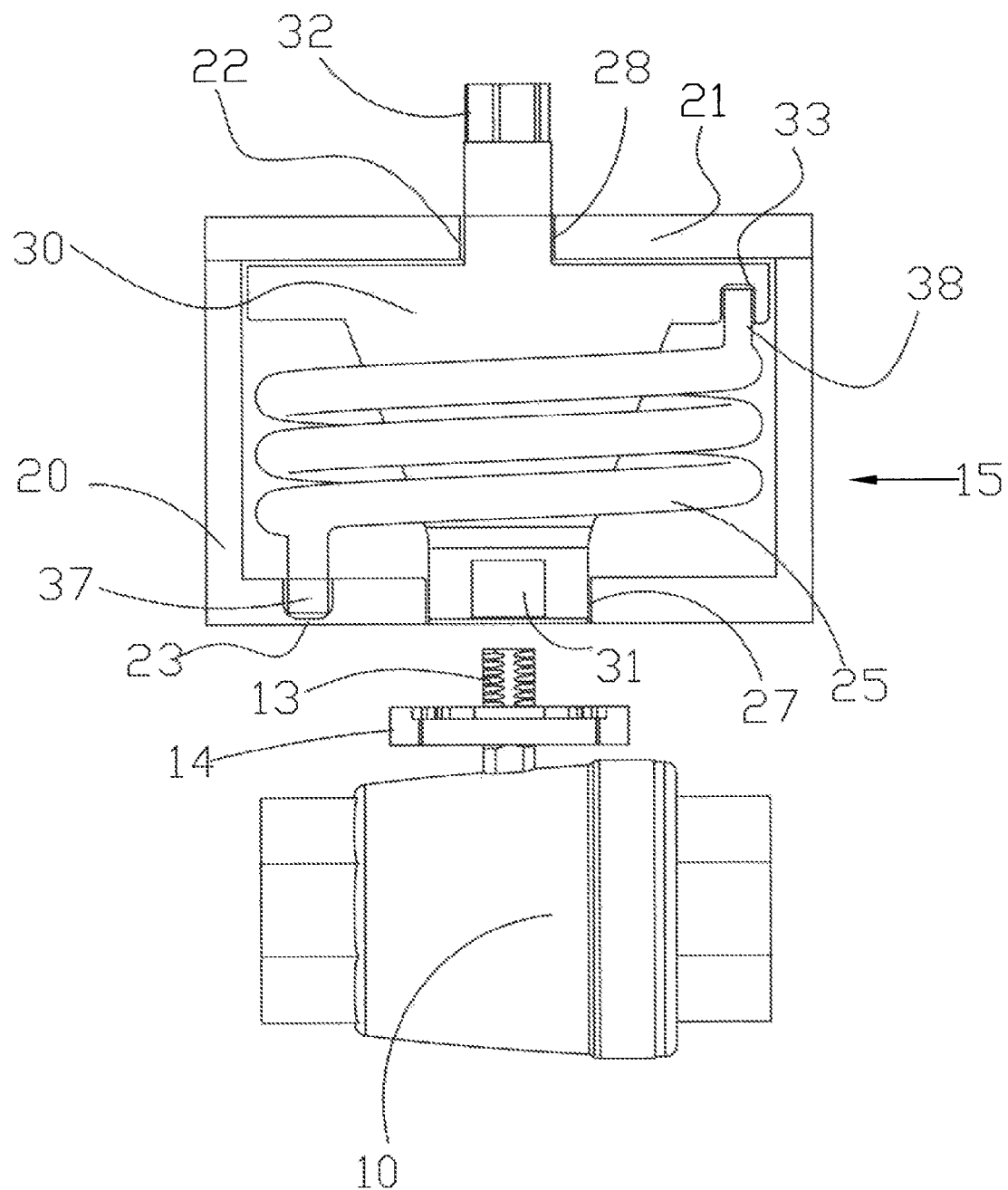
FIG. 3 is a partially exploded, partly sectional view of an actuating mechanism according to the present invention together with a standard ¼ turn valve.

The schematic illustration of FIG. 3 shows how the actuator 15 includes a housing 20 and an actuator drive 30. The actuator drive 30 is rotatably mounted in the housing 20 and has a valve drive socket 31 for connection to the valve stem or shaft 13, which in this example is a ¼ turn square shaft. A spring 25 is fixed between a spring fixing aperture 23 of the housing 20 and a spring fixing aperture 33 of the actuator drive 30. Thus, in the open position of the valve, the actuator drive is at a position where it has been turned against the force of the spring 25, and is held at that position. Upon release of the actuator drive 30 in response to the detection of, for example, seismic activity, the spring turns the actuator drive, which turns the valve stem shaft 13 by the drive socket 31 to close the valve 10.

The spring 25 has opposite end portions 37 and 38 that are received in respective spring fixing apertures 23 and 33.

In this embodiment, valve 10 is a standard quarter turn valve which requires the shaft 13 to be turned for closing or opening the valve. However, the present invention can be equally applied to a quarter turn valve that has an internal spring biasing the valve toward the closed position. In this instance, the spring 25 that is part of the actuator 15 is not required.

The actuator drive 30 connects to the quarter turn square shaft 13 by a connector such as a socket 31. The opposite end of the actuator drive 30 has a reset drive 32 that can be a socket or can be any other suitable surface that can be engaged by a tool for turning of the actuator drive 30 against the force of the spring, whether the spring is the spring 25 or the spring is an internal spring of the valve 10.

Figure 4:
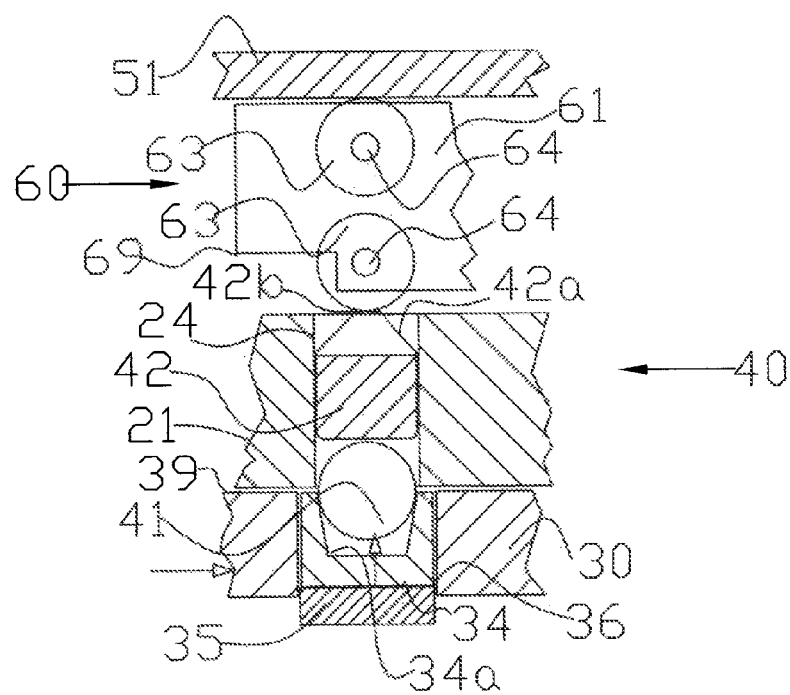
FIG. 4 is a sectional detailed view illustrating components of the present invention holding an actuator drive relative to an actuator housing.

A release mechanism 40 as illustrated in FIG. 4 holds the actuator drive 30 in position against the force of the spring 25 and releases the actuator drive 30 to be rotated in the housing 20 under the force of the spring 25. This mechanism is provided between a surface of the actuator drive 30 and the housing 20. Specifically, a surface of the actuator drive 30, such as in this example an upper surface, adjacent to a lower surface of an upper fixed plate 21 of actuator housing 20, has an aperture 36 formed therein. The aperture 36 receives a locking insert 34 therein, which in turn receives a locking ball 41. As shown in FIG. 4, the locking insert 34 holds the locking ball 41 at a position to hold the actuator drive in position relative to the housing 20. A release pin through hole 24 is formed in the fixed plate 21 of the actuator housing and receives the upper part of the locking ball, while the lower part of the locking ball is held in the locking insert 34 in a locked position, which is an open position of the valve.

The locking ball 41 is preferably a steel ball. The locking insert 34 receives the steel ball, and in order to reset the open position of the valve, a reset to magnet 35 is provided with the locking insert 34 to help attract the locking ball back into the position illustrated in FIG. 4 upon resetting of the valve 10 to the open position.

Various configurations of the aperture in the upper surface of the actuator drive and the locking member that is used to hold the actuator drive in position relative to the housing may be imagined. The locking ball 41 illustrated may be used by itself, or, as a locking member, it could take a different form, such as a pin with a lower angled surface. However, the present inventor has discovered that a preferred arrangement is to employ both the locking ball 41 and a locking pin 42. The locking pin 42 essentially floats on the locking ball 41. Upon detection of seismic activity and release of any blocking of the locking pin 42, the locking ball 41 is pushed upward by an angled surface 34a on the locking insert 34. Through various experiments, this has been found to be the most effective arrangement.

Figure 5:
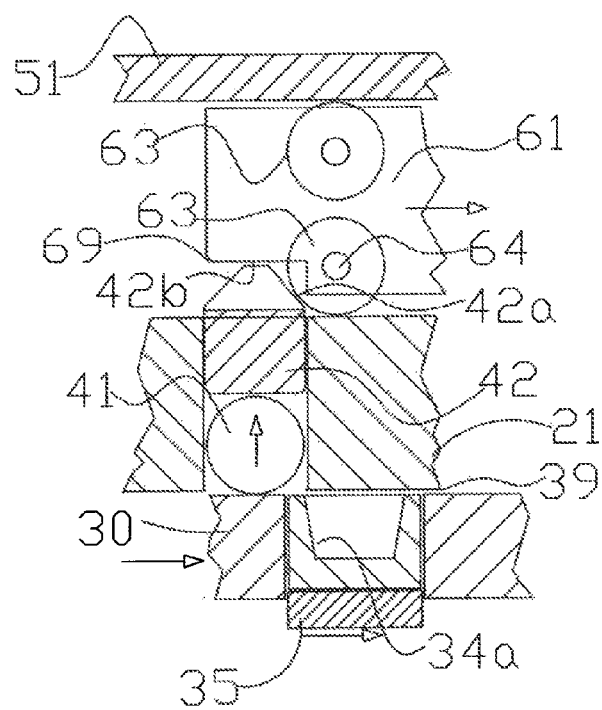
FIG. 5 is a view similar to FIG. 4 showing the release of the actuator drive.

As shown in FIGS. 4 and 5, a slider 60 is used as a blocking device to hold the locking pin 42 in the locked or open position of the valve 10 as shown in FIG. 4. The slider 60 is provided in a housing 61. Top and bottom rollers 63 are mounted on respective roller bearing axes 64 on housing 61 for rolling inside of a roller housing 51. A roller 50 thus includes the side roller housing 51 and the slider 60. The slider 60 includes a locking pin stop 69.

That is, when the slider 60 moves to the released or unlocked position, illustrated in FIG. 5, the following happens. The bias of the spring, for example spring 25, causes an angled surfaced on the locking insert 34 having a locking angle 34a to press the locking ball 41 in an upward direction into the release pin through hole 24. Because the slider 60 has been moved out of the way of the floating locking pin 42, movement of the locking ball 41 in an upward direction as seen in the figures can take place. Specifically, as the slider 60 moves to the right, a bottom roller 63 releases from a roller bearing contact surface 42b on the end of the locking pin 42. This is a small area of contact, and after the roller 63 has moved off of the surface, it becomes engaged by an angled surface on the end of the locking pin 42 having a locking pin angle 42a, which assists movement of the slider 60 in the right hand direction as seen in the figures. As the roller 63 gets out of the way of movement of the locking pin 42, the locking pin 42 moves upward to engage locking pin stop 69 formed on the slider housing 61. At this point, the locking ball 41 has completely left the locking insert 36 and been received in the release pin through hole 24. Thus at this point movement of the actuator drive 30 in the right hand direction as shown in FIG. 5, i.e. in a rotation direction about its axis, under the force of spring 25, to close the valve 10 can take place.

Figure 6:
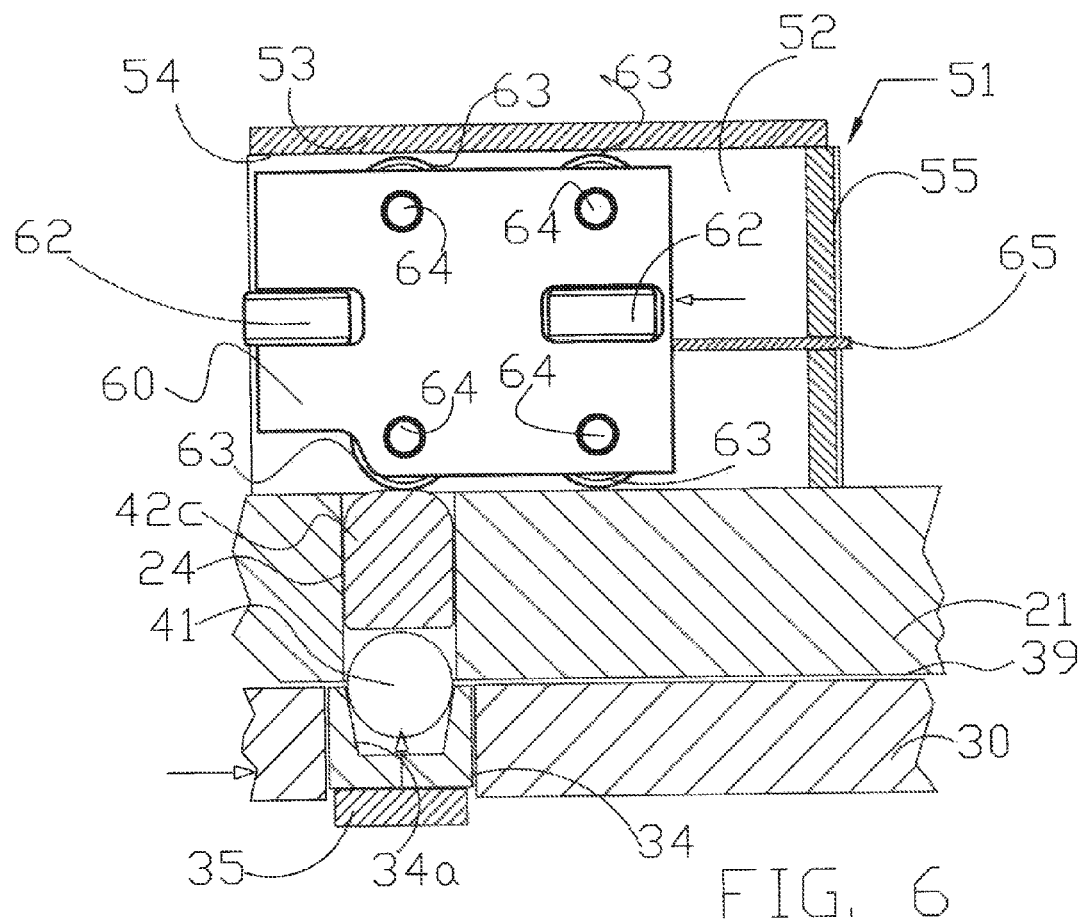
FIG. 6 is a view similar to FIG. 4 illustrating a specific structure of a slider.
Figure 7:
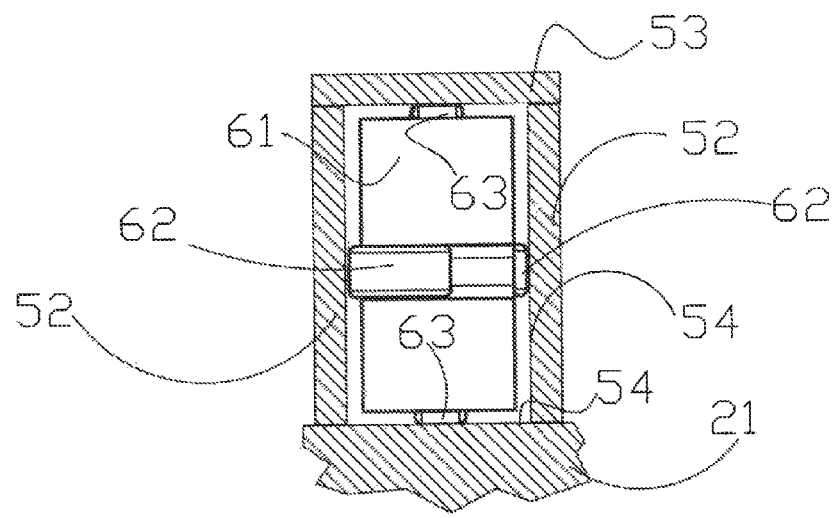
FIG. 7 is a partly sectional view of the slider illustrated in FIG. 6.

FIG. 6 illustrates one preferred arrangement of the locking pin, designated 42c, in which the locking pin has curved edges. As also seen in this figure, the slider 60 preferably has its housing 61 made up of two separate wall members between which are mounted the roller bearing axes 64 mounting rollers 63. Side rollers 62 are also provided as seen in this figure for the purpose of engaging side walls 52 of the roller housing 51.

The roller housing 51 includes a top plate 53, further, in addition to the side walls 52 and also a back wall 55. Release cable 65 extends through the back wall 55 in this example to connect to slider 60.

With the arrangement illustrated in FIG. 6, the locking pin has curved upper side surfaces, as opposed to the surface having a locking pin angle 42a as illustrated in FIGS. 4 and 5. Otherwise, the arrangement works in the same manner as that of FIGS. 4 and 5.

The present inventor has further discovered the following. If the locking angle 34a of the locking insert 34 is too steep, then not enough force will be applied to the locking ball 41 to move the locking ball up into the through hole 24, and if the angle 34a is too shallow, there will be too much force that is applied. Upon release of the locking pin 42c by the slider 60, it has been found that the angle on the locking insert should preferably be from 15° to 35° relative to the direction of movement of the locking pin 42c in through hole 24. More preferably, the angle should be 18 to 20° for optimum operation. With the above arrangement of the locking insert and locking ball, it has been found that as little as two ounces of force is necessary to move the slider 60 to allow the actuator drive 30 to release under the force of spring 25 with 50 foot pounds of torque, or 300 pounds of force with a 2 inch radius. In other words, with the mechanical arrangement according to the present invention, a very large valve closing force can be released using a very small amount of release for trigger force.

It is further preferred that the locking ball 41, when positioned in the locking insert 34, be actually slightly lower than halfway down into the locking insert.

A specific example of a roller 50 using a slider 60 has been described above as a blocking device. Many different arrangements for a blocking device for blocking movement of the locking ball and the floating locking pin may be imagined. The primary requirement of any such blocking device is that it be movable between a position blocking movement of the locking ball, serving as a locking member, and a position allowing the locking ball to move to release the actuator drive to rotate and close the valve.

As illustrated in this embodiment, the roller housing 51 is mounted on a surface of the fixed plate 21 of the housing 20. It has been determined that a slight clearance between the rollers of the slider 60 and the roller housing 51 is required. Further, it is preferable that there is a slight slope to the top plate 53 so that the clearance with the rollers of the slider 60 increases as the slider 60 moves toward the left as shown in FIG. 6. Relative to the surface of the fixed plate, the top plate 53 of the roller housing 51 may be parallel, but a slight slope, up to 10°, is preferred. It should not be angled down. A slope of 2 to 5° is most preferable. Top plate 53 and side walls 52, as well as the upper surface of fixed plate 21, thus all have respective rolling surfaces 54 for the slider 60.

Figure 8:
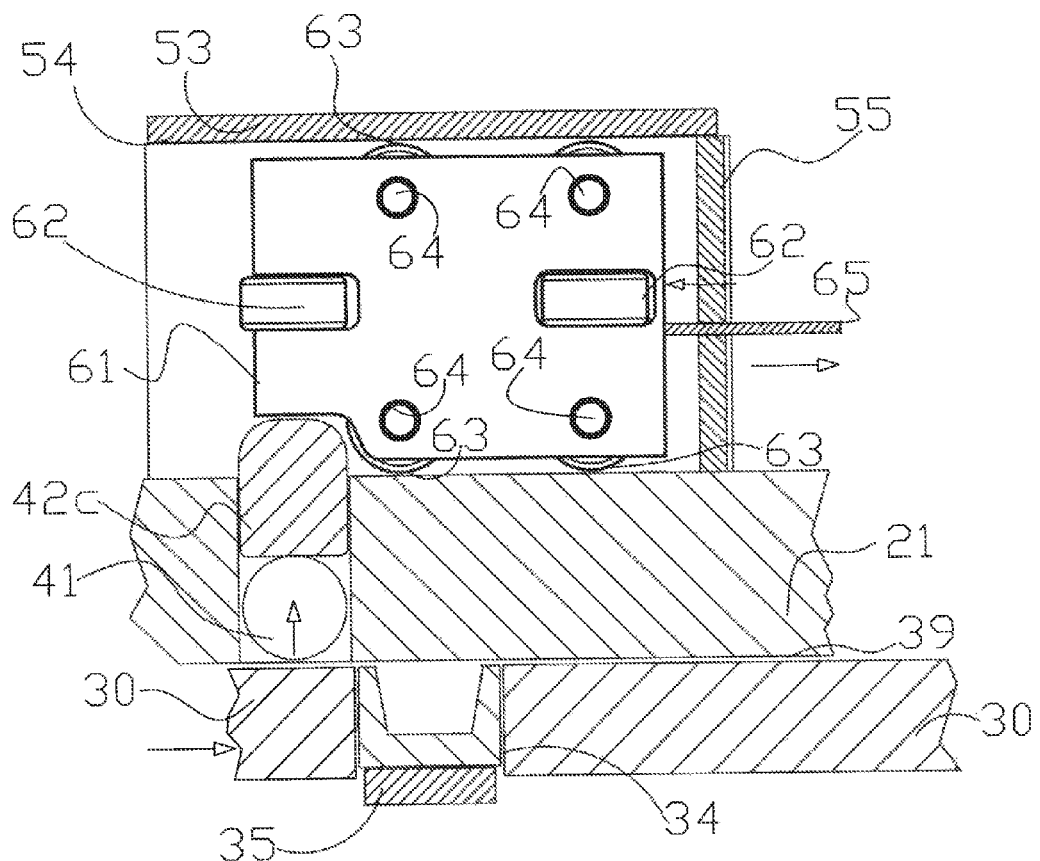
FIG. 8 is a view similar to FIG. 6 illustrating a slider in the activated or unlocked position of the actuating mechanism.

A return spring (not illustrated) is provided around the release cable 65 so that, upon pulling of the release cable to move the slider 60 toward the right to release the floating pin 42 and the locking ball 41, the spring is compressed. The activated position, or the closed position of the valve, is shown by FIG. 8. In this figure, the floating locking pin 42c has been extended out of the through hole 24 and the locking ball has moved up out of the locking insert 34 entirely into the through hole 24. This has allowed movement of the actuator drive along sliding surface 39 relative to the fixed plate 21 of the housing 20 under the force of the spring 25 to close the valve. When it is then desired to reset the valve, a suitable tool is applied to the reset drive 32, and the actuator drive 30 is turned relative to the housing 20 until the locking insert 34 again lines up with the through hole 24. At this point, the locking ball 41 will drop down into the locking insert 34 under the force of gravity and/or under the force of the reset magnet 35. At the same time, the floating locking pin 42c will drop into the through hole 24. This moves the floating locking pin 42c out of the way of the slider 60. The reset spring then pushes the slider 60 back to its position as illustrated in FIG. 6.

Figures 9, 10:
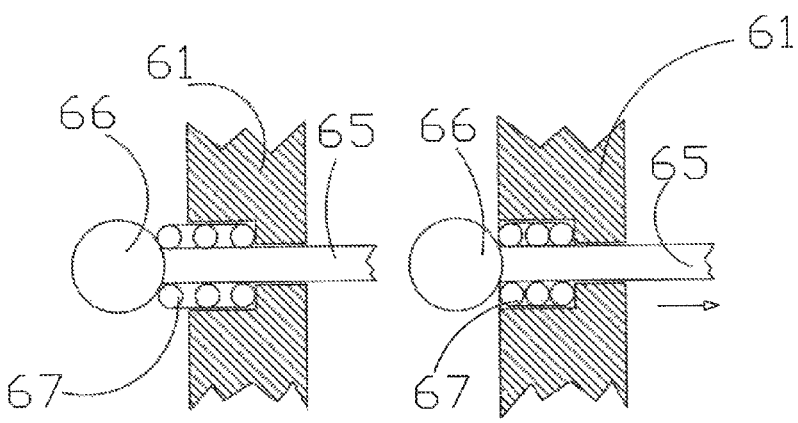
FIG. 9 is a schematic illustration of a backlash mechanism.
FIG. 10 is a view similar to FIG. 9 showing how the backlash mechanism operates.

As noted above, the release cable 65 is what moves the slider 60 to allow the valve to be closed. It is preferable that a backlash mechanism be provided in order to take up tolerances in the release cable 65. One suitable example of such a mechanism is illustrated in FIGS. 9 and 10. A cable end 66 on the end of cable 65 is biased by a backlash spring 67 toward the left as shown in FIG. 9. The spring 67 is mounted in a suitable recess 68 in slider housing 61. When the cable 65 is pulled, the initial pulling force is taken up by spring 67.

Figure 11:
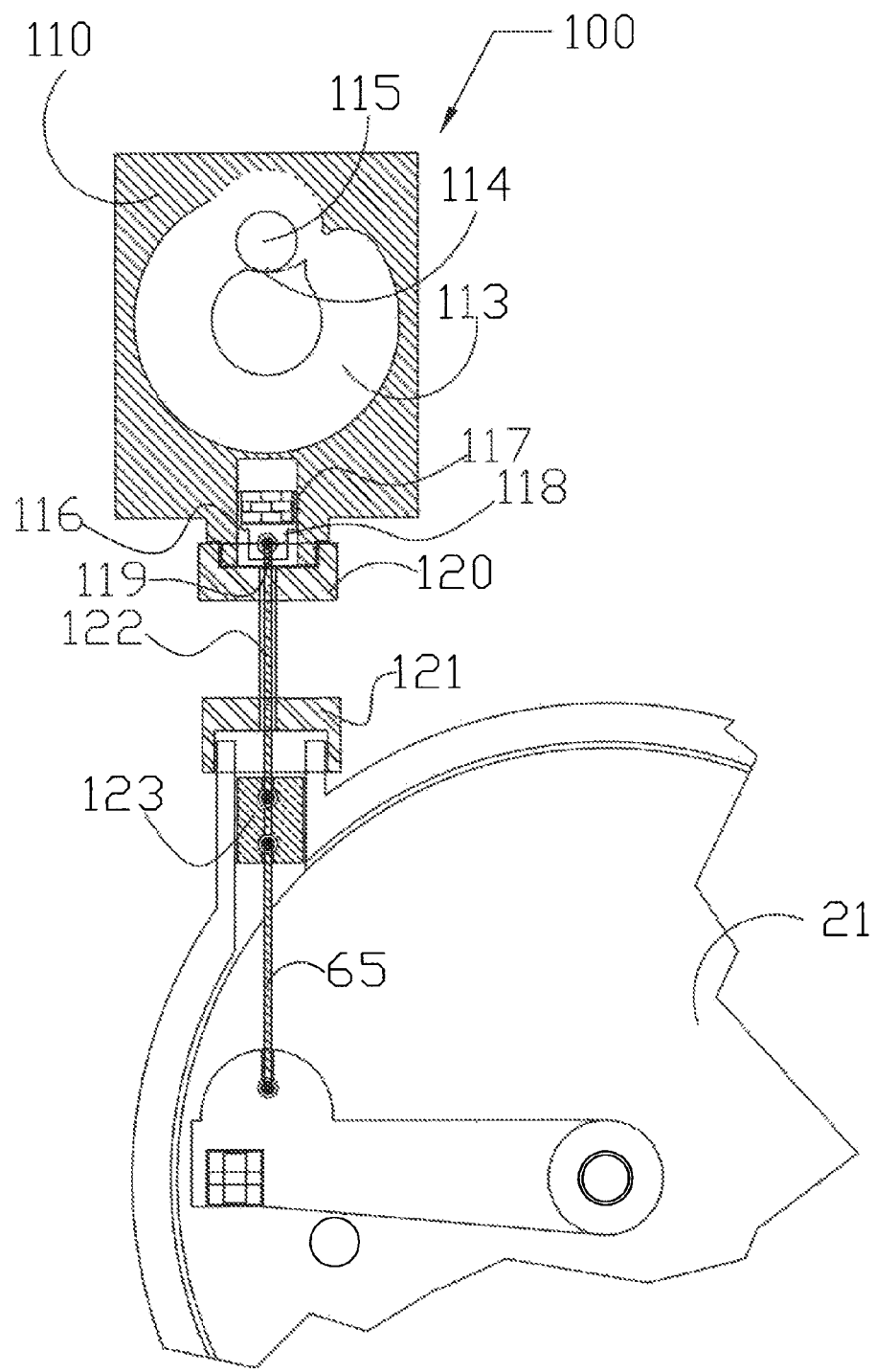
FIG. 11 is a schematic view of a mechanical seismic sensor in connection with the actuating mechanism.

FIG. 11 illustrates a seismic sensor 100 suitable for responding to seismic activity and pulling on release cable 65 to shut off the valve. (The cable 65 is shown as connected to an unreferenced lever in FIGS. 11, 12, 21, 22 and 23. The lever is an alternative to the slider 60, but the slider type of arrangement is preferred.) This first example of a seismic sensor is a mechanical sensor 100 that has a sensor housing 110. Inside the housing 110 is a ball track 113, a pedestal 114 and a ball 115. Upon predetermined seismic activity occurring, the ball will undergo sufficient movement to leave the pedestal 114 and fall into the ball track 113. The arrangement of a ball and pedestal seismic sensor is per se known, and reference may be had to earlier patents by the present inventor noted in the Background of Invention, which are incorporated herein by reference.

A recess 116 in a magnet holder 118 holds a magnet 117. The magnet 117 held by the magnet holder 118 has a link connection 119 to a cable conduit 122 that extends between end caps 120 and 121. Thus a cable extends from the magnet holder 118 through the cable conduit 122 to a link connection 119 connecting to release cable 65. Thus movement of the magnet 117 will pull on the cable 65 to move the slider 60.

Ball 115 is a steel ball to which the magnet 117 will be attracted. The steel ball, upon a seismic event dislodging the steel ball from the pedestal 114, falls into ball track 113 and descends to a position adjacent magnet recess 116. The magnet is then attracted to the steel ball, causing a pull on the cable and thus a pull on the release cable 65 to move the slider 60 and close the valve.

In the above example, a two ounce minimum force was discussed as being necessary for the slider 60. A suitable magnet 117 can be provided, with a gap of about 10 mm or about ⅜ of an inch from the steel ball 115, to provide approximately one pound of force. With the use of a ½ inch diameter steel ball, by being able to provide a one pound force for pulling cable 65, where only 2 ounces is necessary, a large safety factor is introduced.

Figure 12:
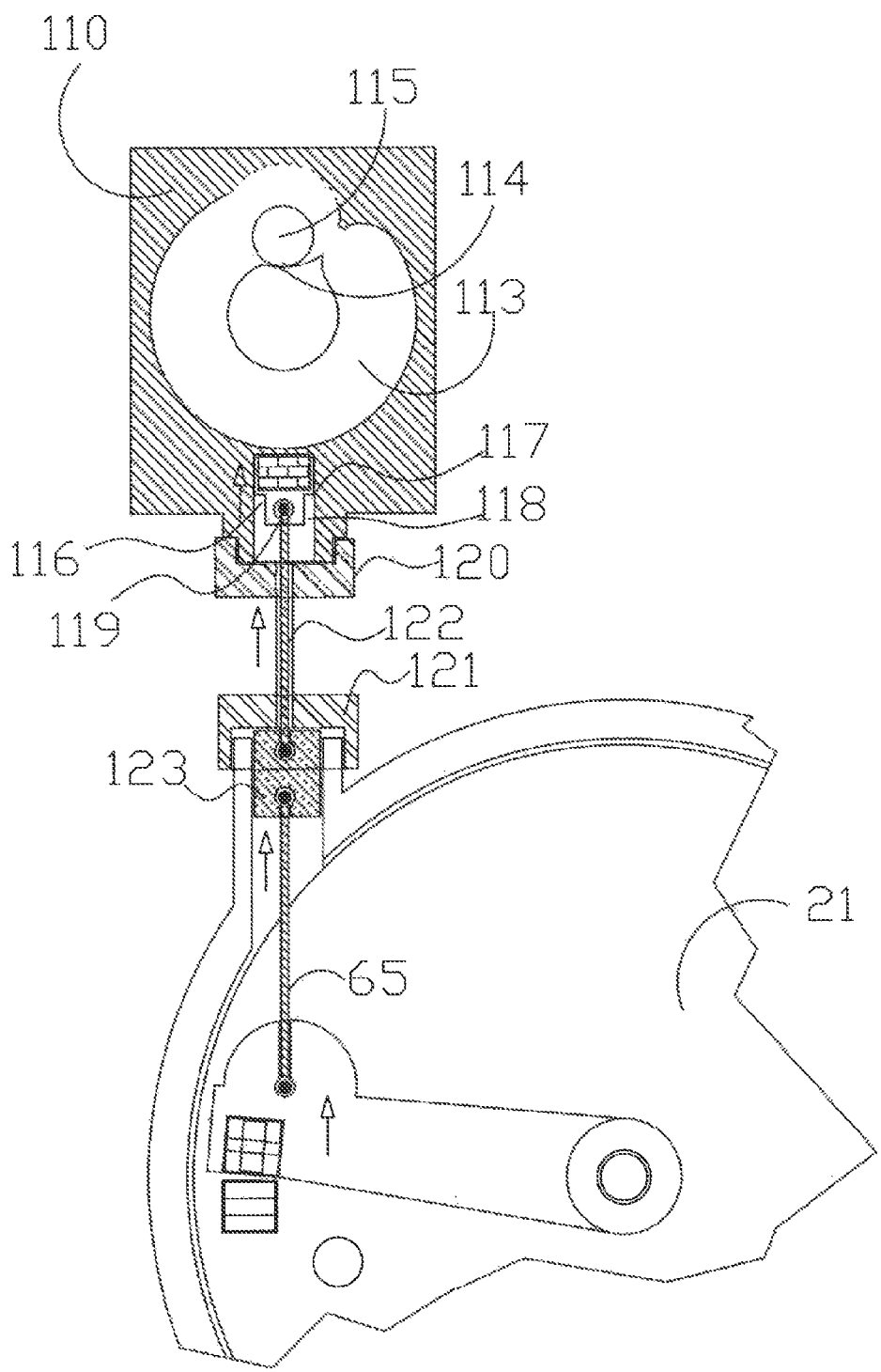
FIG. 12 is a view similar to FIG. 11 showing activation of the mechanism upon detection of seismic activity.

FIG. 12 illustrates the activated position in which the magnet 117 has been attracted toward the steel ball 115, and the cable 65 has been pulled.

Figure 13:
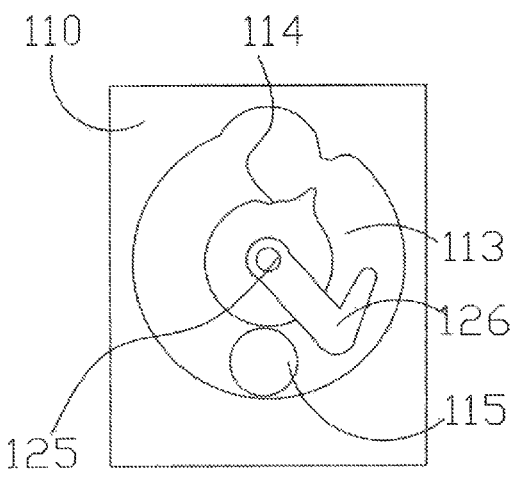
FIG. 13 is a schematic cross-sectional view of a preferred embodiment of mechanical seismic sensor.
Figure 14:
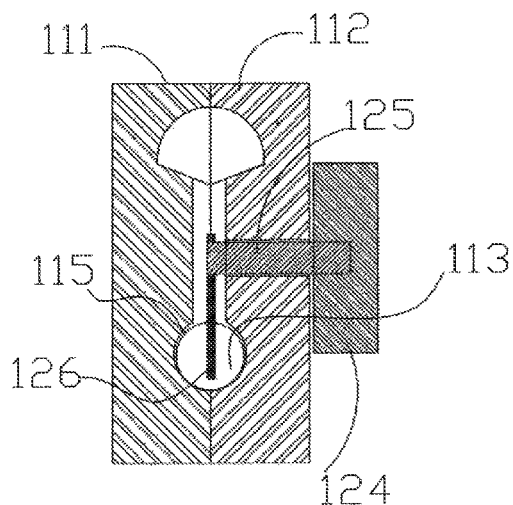
FIG. 14 is a sectional view of the sensor of FIG. 13.
Figure 15:
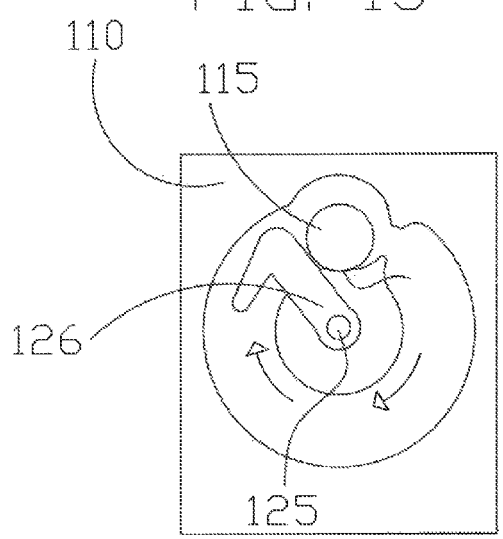
FIG. 15 is a view similar to FIG. 13 illustrating resetting of the mechanical seismic sensor.
Figure 16:
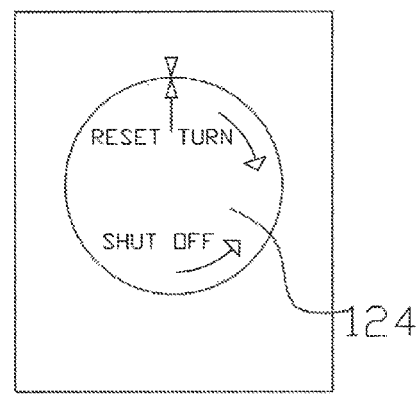
FIG. 16 is an external view of the sensor of FIG. 15.

FIGS. 13-18 illustrate an arrangement of a mechanical sensor generally described with respect to FIGS. 11 and 12. That is, as shown in FIG. 13, a reset arm 126 is provided, press fit on a reset shaft 125 extending into the housing 110, for the purpose of being able to both reset the steel ball 115 on the pedestal 114, and also manually activate the valve shut off mechanism. Noting FIG. 14, sensor housing 110 includes a left half 111 and a right half 112, allowing the reset arm 126 to be assembled therein by being press fit on reset arm shaft 125. Reset arm shaft 125 has a reset handle 124. Suitable external indicators are provided as illustrated in FIG. 16, and the reset action is illustrated in FIG. 15. Thus as can be determined from FIGS. 15 and 16, in order to reset, from the position illustrated in FIG. 16, the handle 124 is turned clockwise as seen in FIG. 16 until the reset arm 126 contacts the ball 115 and moves the ball 115 along the ball track 113 until it moves back to the pedestal 114 as illustrated in FIG. 15. The handle is then turned counterclockwise back to the position illustrated in FIG. 16.

Figure 17:
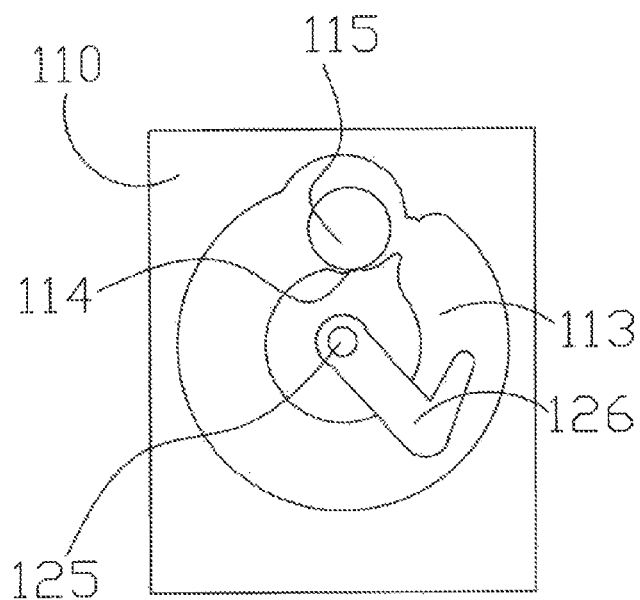
FIG. 17 is a view similar to FIG. 13 illustrating the seismic sensor before activation.
Figure 18:
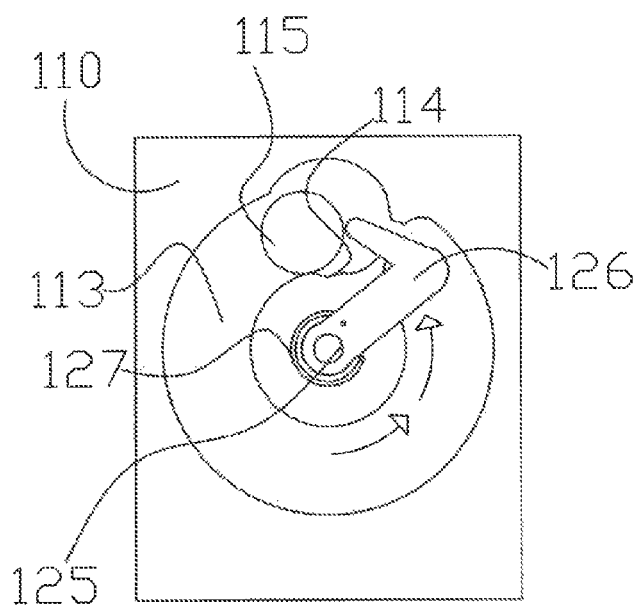
FIG. 18 is a view similar to FIG. 17 illustrating manual activation of the mechanical seismic sensor.

Manual activation is illustrated in FIGS. 17 and 18. Manual activation is by turning the handle 124 counterclockwise so that a projecting end of the reset arm 126 contacts the ball 115 sitting on the pedestal 114. Continuing to turn the handle 124 causes the projecting end of the reset arm 126 to push the ball off of the pedestal 114 so that it can roll along the track 113 to the position illustrated in FIG. 13, for example. Note that the reset arm/reset shaft may be spring loaded as illustrated in FIG. 17 to avoid unintentional manual activation of the valve as well as interference with the normal shut off operation in response to seismic activity. Specifically, a torsion spring can be connected between the housing 110 and the reset arm 126 to bias the reset arm 126 to a neutral position. The neutral position is, for example, illustrated in FIGS. 13 and 17, and also in FIG. 16.

Figure 19:
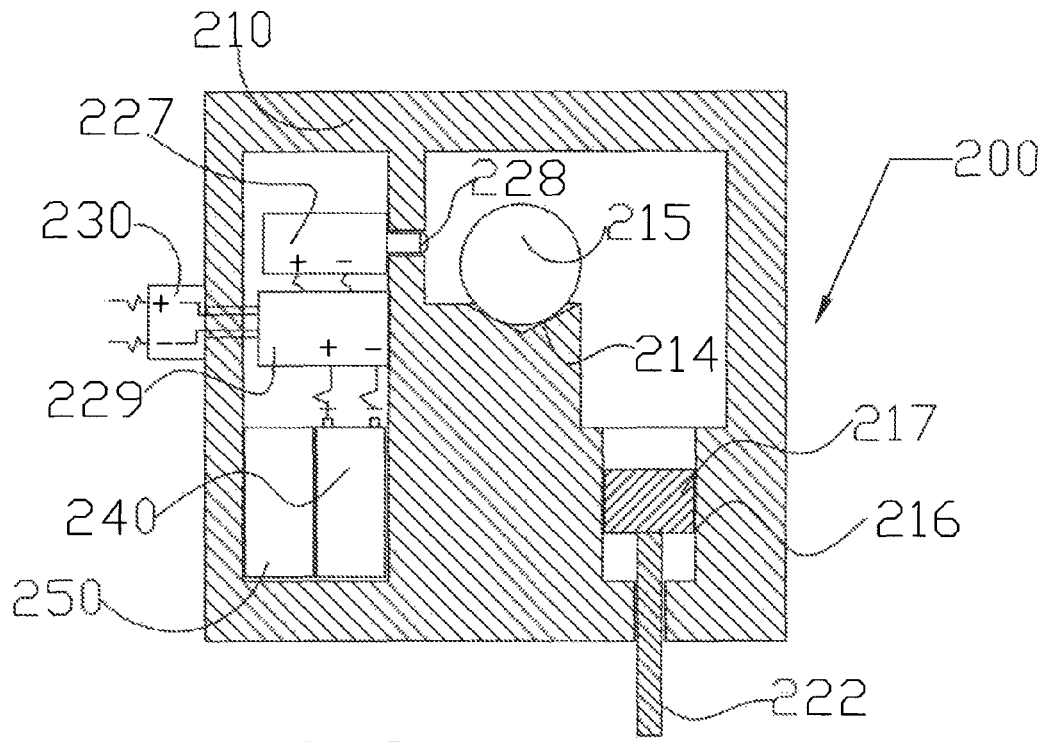
FIG. 19 is a partly sectional, schematic view of an alternative embodiment of a seismic sensor.
Figure 20:
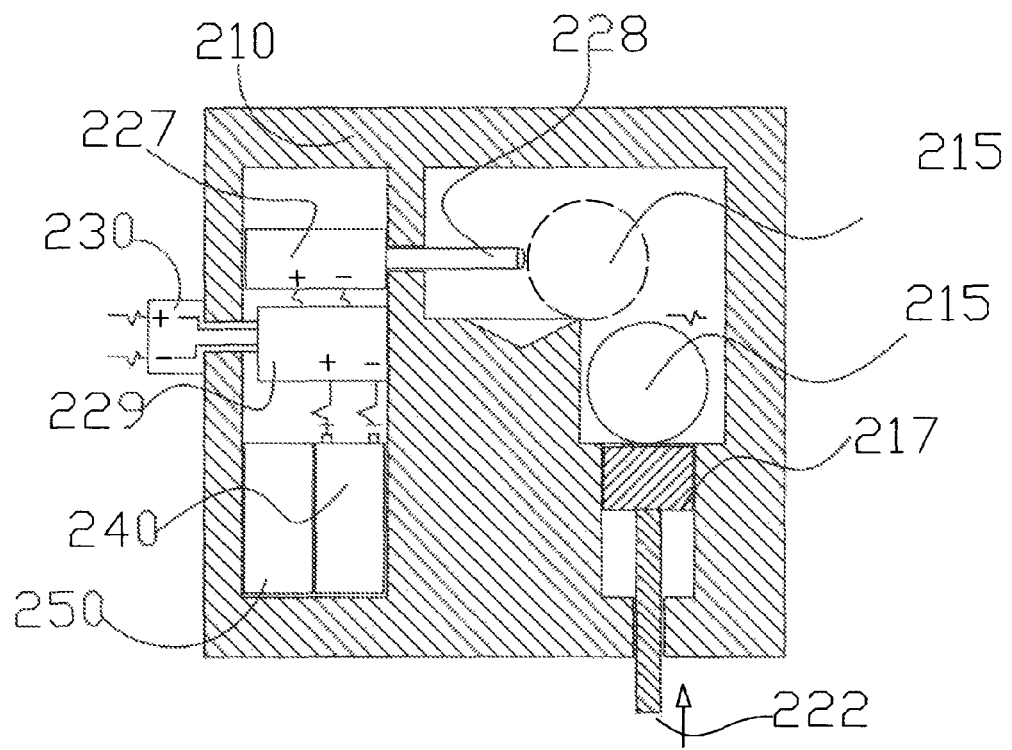
FIG. 20 is a view similar to FIG. 19 illustrating remote or electronic activation of the seismic sensor of FIG. 19.

FIGS. 19 and 20 illustrate an alternative mechanical seismic sensor 200, which sensor can also be remotely electronically activated. This sensor 200 includes a sensor housing 210, pedestal 214 and steel ball 215. A magnet 217 connected to a cable 222 may also be provided. These are illustrated schematically, but the arrangement may be similar to that as illustrated in FIG. 11, for example.

In addition to the mechanical arrangement, a solenoid 227 having a plunger 228 is provided adjacent the pedestal so that, as illustrated in FIG. 20, activation of the solenoid causes the plunger 228 to engage the steel ball 215 so that it leaves the pedestal 214 and activates shut off of the valve. To this purpose, a suitable control 229 connected with the solenoid 227 and a power supply or battery 240 is provided. Activation may be by a remote switch that is directly wired in or through R/F (radio frequency) control as illustrated by R/F control unit 250.

Figure 21:
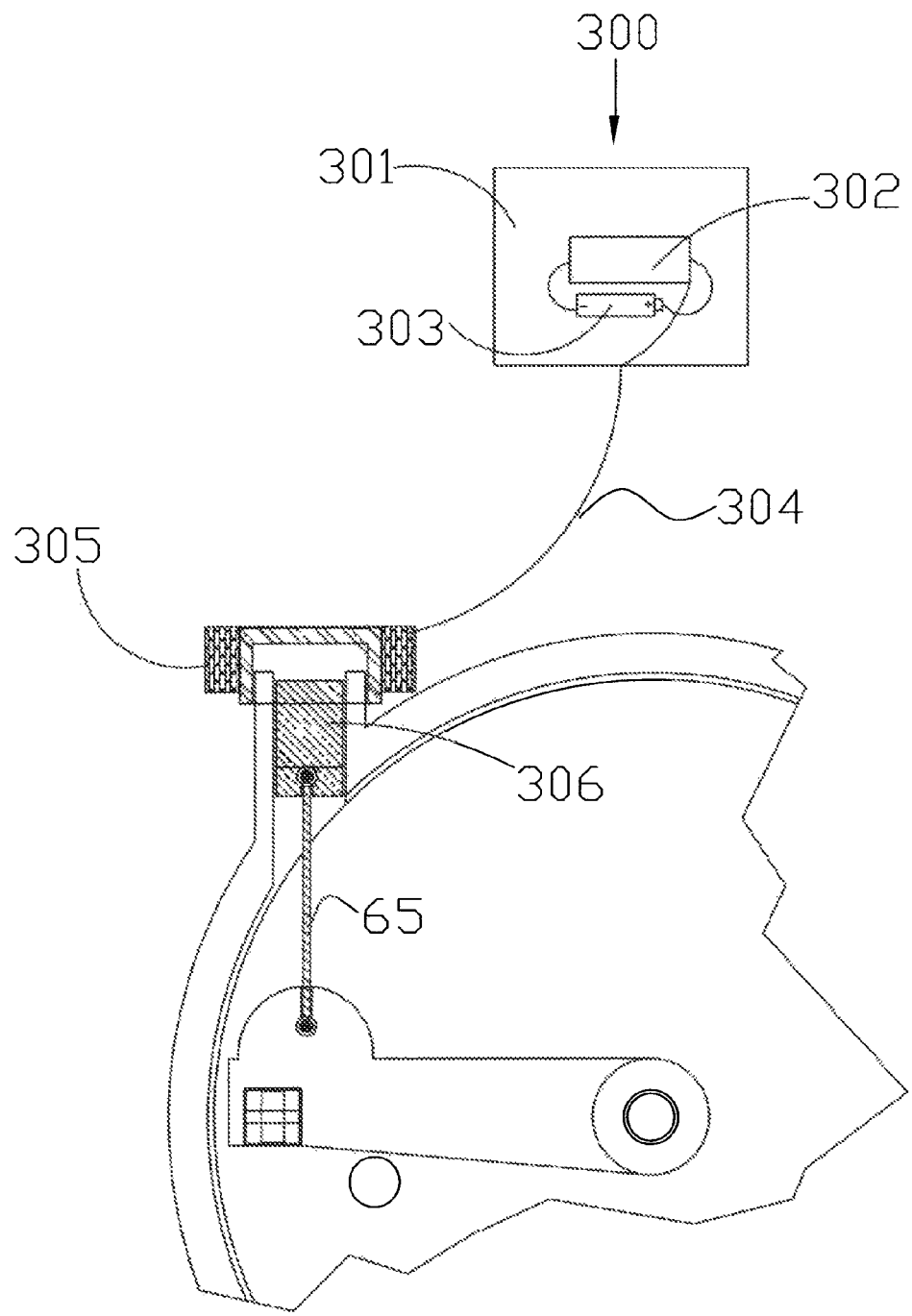
FIG. 21 is a schematic view of an alternative control arrangement for activating the actuating mechanism according to the present invention.
Figure 22:
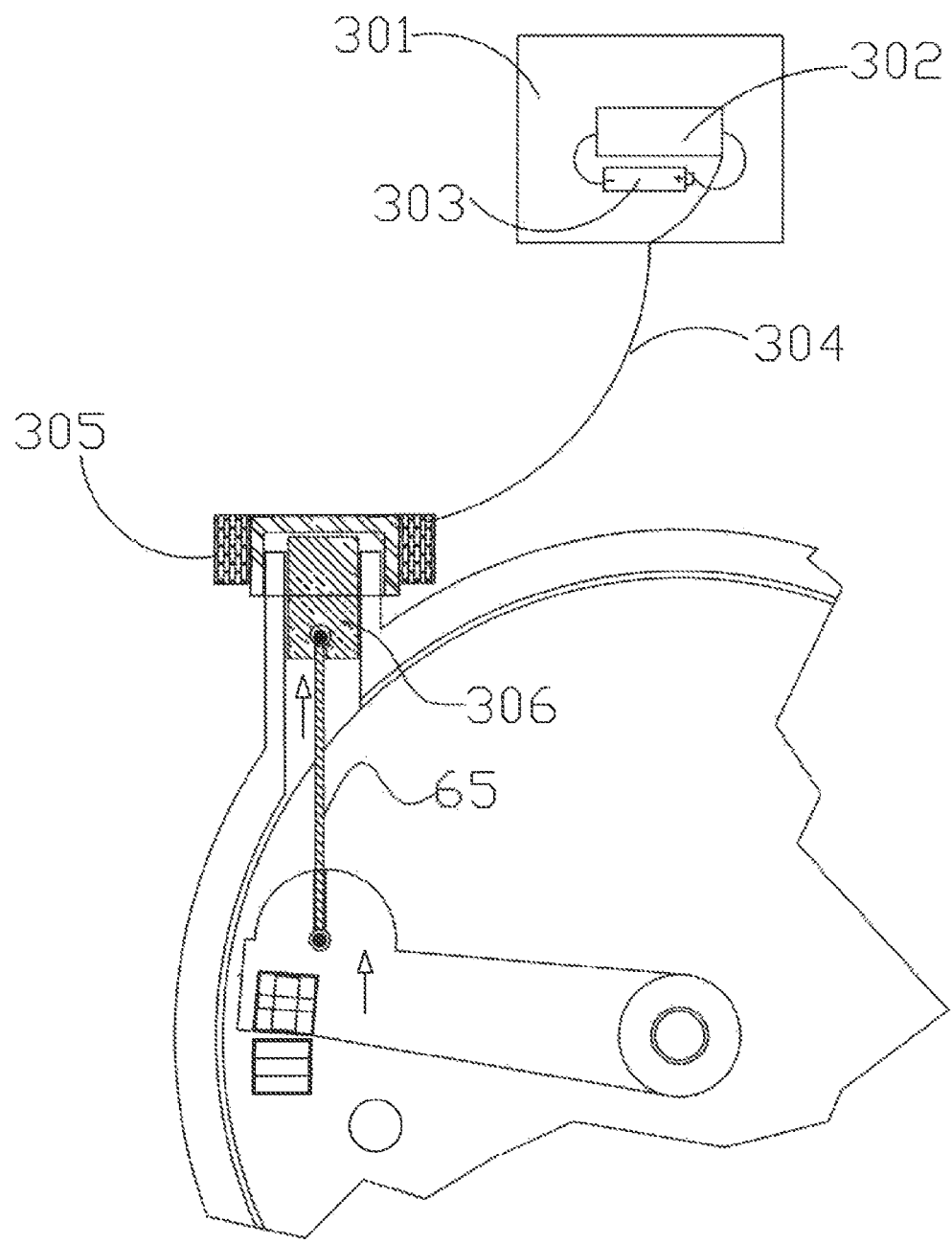
FIG. 22 is a view similar to FIG. 21 showing activation of the mechanism.

FIGS. 21 and 22 illustrate an electrical seismic sensor 300. A control box 301 includes valve control sensors 302 and a power supply or battery 303 connected therewith. The control box 301 is connected by wire 304 to a solenoid 305 having a solenoid pin 306. The solenoid pin 306 has a link connection to cable 65 as previously illustrated. In this manner, solenoid 305 can be directly activated under control of the valve control sensors 302 to cause the release cable 65 to be pulled to shut off the valve.

Figure 23:
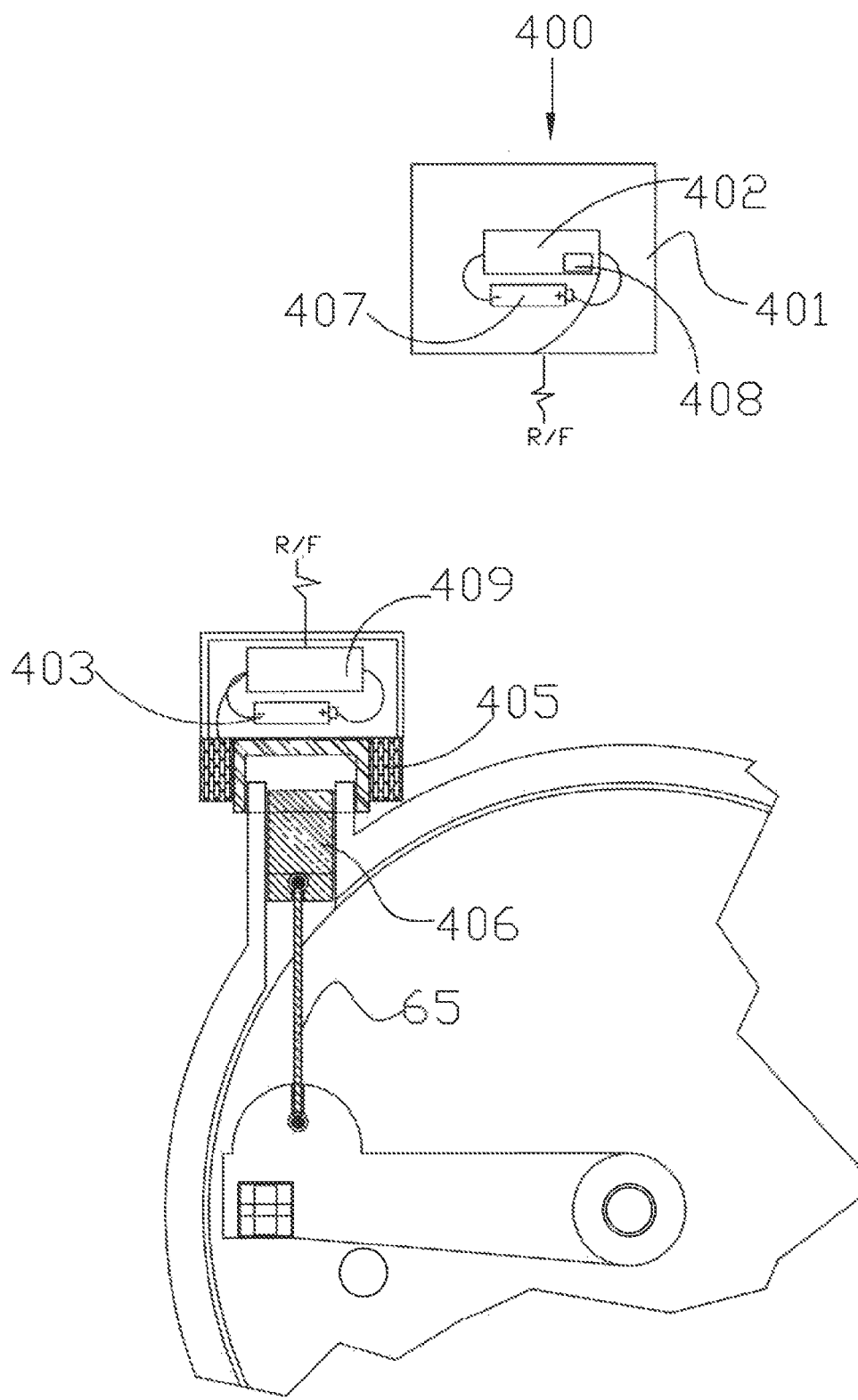
FIG. 23 is a view similar to FIG. 21 showing yet another alternative embodiment.

FIG. 23 illustrates an arrangement similar to FIG. 21. However, in this instance the electrical seismic sensor 400, including a control box 401, valve control sensors 402, a power supply or battery 407, also includes an R/F transmitter and controls 408. These communicate with R/F receiver and controls 409 provided with solenoid 405. A separate battery or power supply 403 is provided, thus, with the solenoid 405. In a similar fashion, a solenoid pin 406 is connected with the release cable 65.

Figure 24:
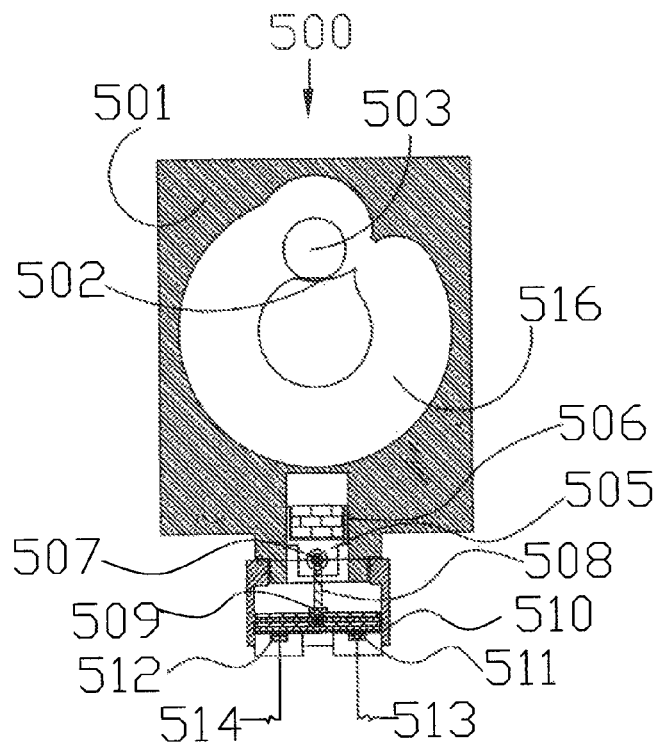
FIG. 24 is a partly sectional, schematic view of a mechanical seismic sensor for activating an electrical switch.
Figure 25:
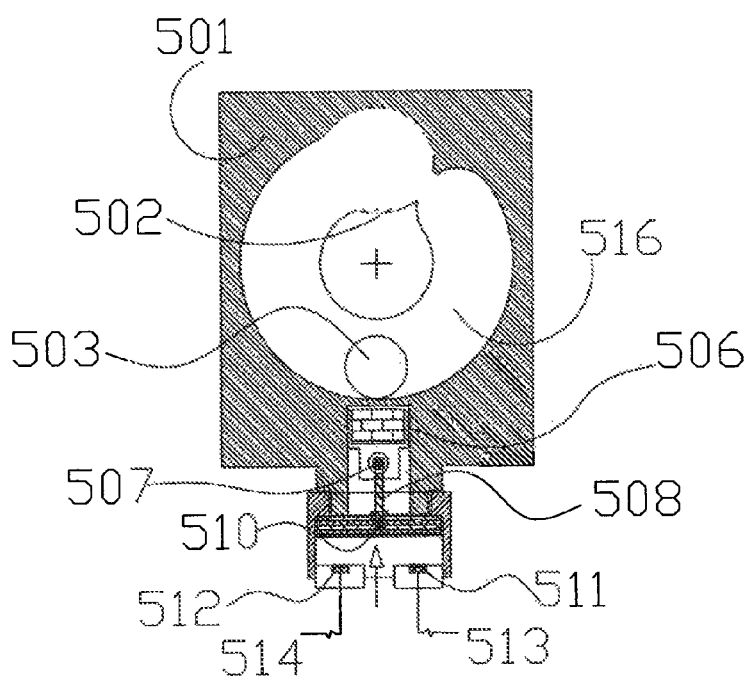
FIG. 25 is a view similar to FIG. 24 illustrating the sensor and switch of FIG. 24 in an activated state.

FIGS. 24-25 illustrate a further embodiment according to the present invention. A mechanical switch actuator 500 is a mechanical seismic sensing arrangement similar to that previously described. That is, it includes a housing 501, a pedestal 502 and a steel ball 503. A magnet recess 504 is provided at a lower point in the housing, and receives a magnet 506 held by a magnet holder 505. In this case, the arrangement is used for opening an electrical switch in case of the detection of a seismic event.

Thus, the magnet holder 505 has a linkage 507 and a cable 508 for connecting to a contact link 510. The contact link 510, in a normal operation of an electrical circuit, connects a contact-in 511 with a contact-out 512 so that a power-in circuit 513 is connected to a power out circuit 514 in normal operation.

However, upon the detection of a seismic event, the steel ball 503 is caused to the leave the pedestal 502, descending in ball track 516 as in the above-described embodiments. The steel ball 503 thus reaches a position adjacent to the magnet recess 504 and the magnet 506 is attracted to the steel ball 503, and thus the magnet holder 505 pulls on the cable 508 to disconnect the contact link 510 from the in and out contacts 511 and 512. Thus, upon the detection of a seismic event, the circuit is broken and the electrical switch is open.

In a modification of the embodiment of FIGS. 24 and 25, a pivot may be provided at one side of contact link 510. By providing the pivot for the contact link 510 to pivot on, a smaller amount of force can be used to move the contact link.

Figure 26:
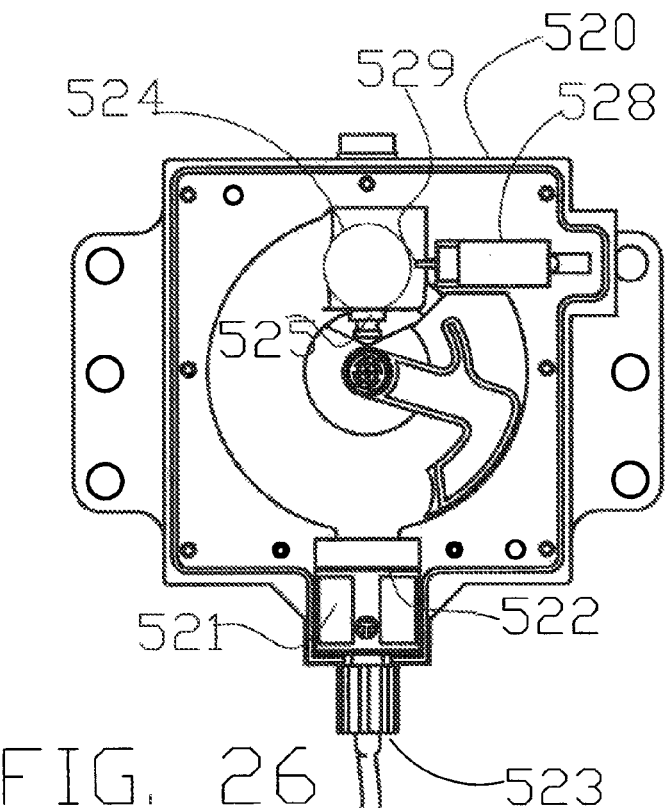
FIG. 26 is a schematic illustration of a mechanical sensor that includes solenoid activation.

FIG. 26 schematically illustrates how a solenoid actuated sensor may be constructed in accordance with the present invention. A housing for the sensor includes a back housing 520, and in the illustration the front of the housing is removed so that the internal mechanism may be viewed. A ball 524 such as described above, made of steel, is positioned on a pedestal 525. The pedestal 525 may itself be a seismic sensor pedestal, being shaped so as to maintain the ball in position until sufficient seismic activity causes the ball to leave the pedestal, or the ball may be held in place magnetically such that only activation of a solenoid 528 will cause the ball to leave the pedestal. The solenoid 528 is positioned adjacent to the ball 524 so that any type of remote sensor, such as a carbon monoxide sensor, a fire sensor, etc. can be connected with the solenoid 528 to cause activation of the actuating mechanism. The solenoid 528 has a pin 529 which, when the solenoid 528 is activated due to a sensor, for example, detecting carbon monoxide, causes the ball to leave the pedestal and fall to the bottom of the housing 520.

At the bottom of the housing 520, the ball will cause a magnet 522 in a magnet holder 521 to be attracted thereto, pulling on a cable, as described above. A cable mould 523 is illustrated at the connection point where the cable comes into the housing 520.

Figure 27:
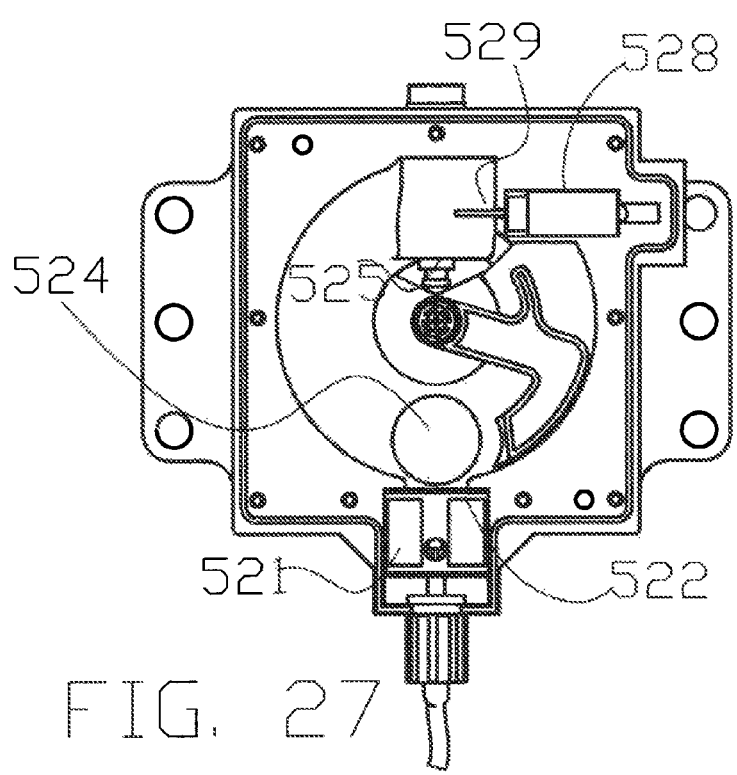
FIG. 27 is a view similar to FIG. 26 illustrating activation of the sensor of FIG. 26.
Figure 28:
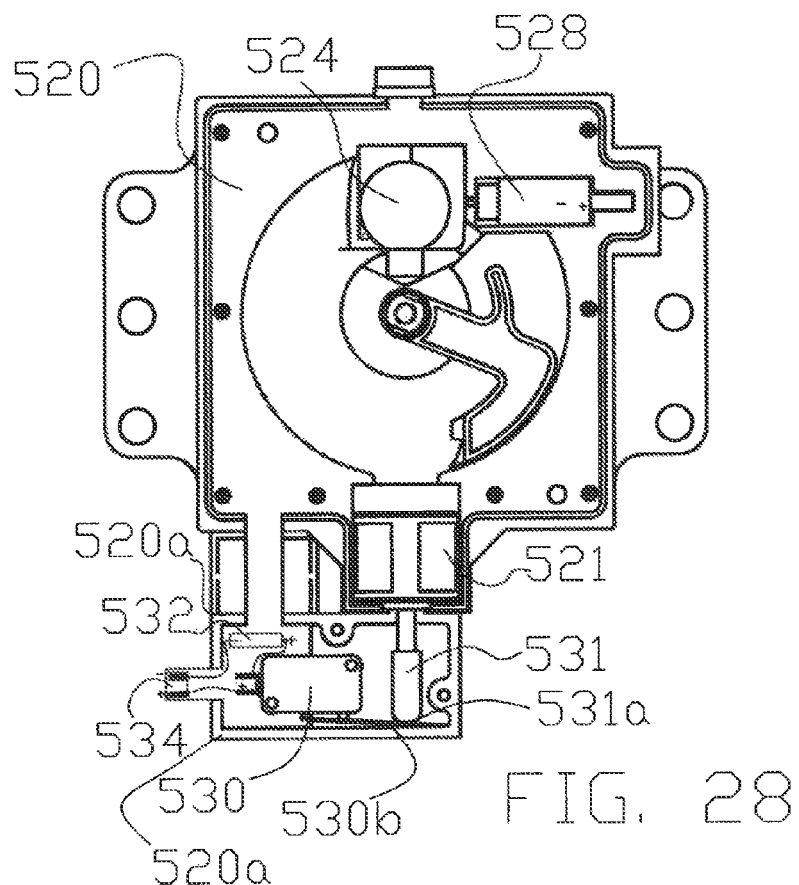
FIG. 28 is a schematic illustration of a mechanical sensor similar to FIG. 26, but with the sensor connected to an electrical switch instead of a cable.
Figure 29:
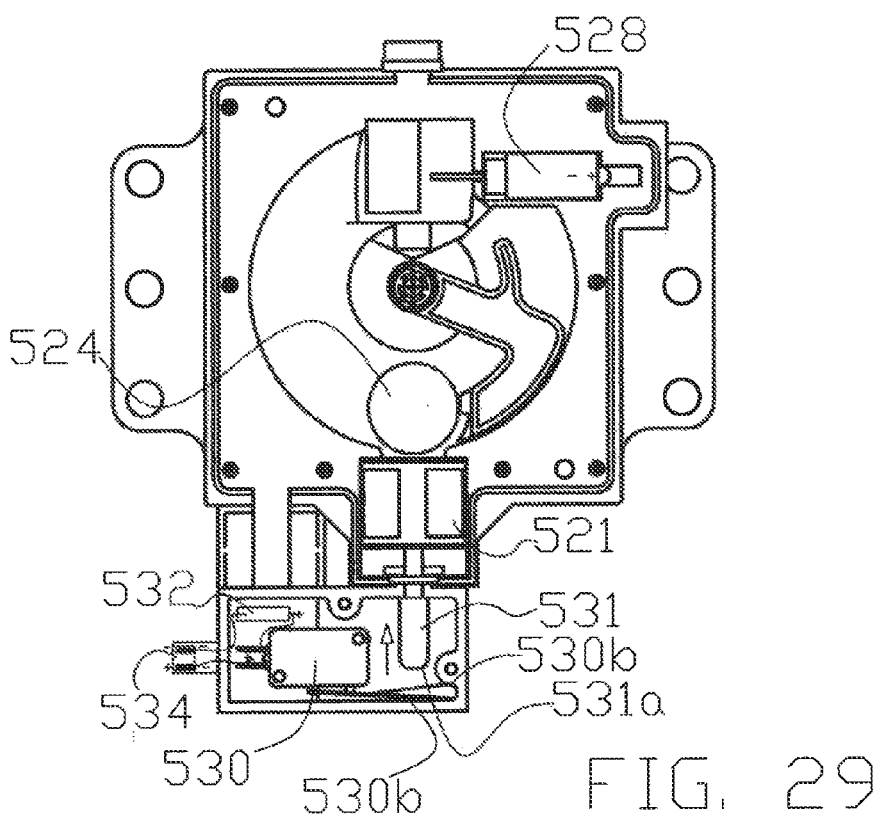
FIG. 29 is a view similar to FIG. 28 illustrating the sensor of FIG. 28 in its activated position.

FIGS. 28 and 29 are similar to FIGS. 26 and 27, but instead of the magnet 522 and magnet holder 521 being connected with a cable, a pin 531 is attached to the magnet holder. Accordingly, when the sensor is activated, the magnet and magnet holder 522 and 521 move upward, to cause the pin to move up. This causes a lever micro-switch 530 to be activated, closing (or alternatively opening) an electrical circuit. The electrical circuit may be used to actuate a mechanism such as the valve actuating mechanism described above, etc.

Specifically, a switch box 520a is attached to sensor housing 520. A power source 532, such as a battery, has one lead connected to a two pole connector 534. The other lead of the power source is connected to one lead of the micro-switch 530. The other lead of the micro-switch is connected to the other pole of the two pole connector 534. When the ball 524 is in its activated position as shown in FIG. 29, having left its pedestal due to activation of the solenoid 528 or otherwise, the magnet 521, connected to the pin 531, is attracted to the ball 524. The magnet 521 then lifts the pin 531 upward as shown in FIG. 29. The pin 531 at point 531a magnetically attracts and lifts spring loaded micro-switch extension 530b against the spring force of the micro-switch 530 until extension 530b contacts a stop point 530b (FIG. 29). This momentarily completes the circuit so as to provide power from power source 532 to the two pole connector 534. Because the magnet 521 continues to pull the pin 531 upward, contact between the point 530a on the pin 531 and the extension 530b is broken when the extension contacts the stop point 530b. This results in the spring of the micro-switch returning the extension to the position of FIG. 28, breaking the circuit to the connector 534. Thus the supply of power to the connector 534 is momentary. The momentary supply of power can be used directly or indirectly to e.g. send a signal to shut off a valve or to trigger an electronically operated valve.

Figure 30:
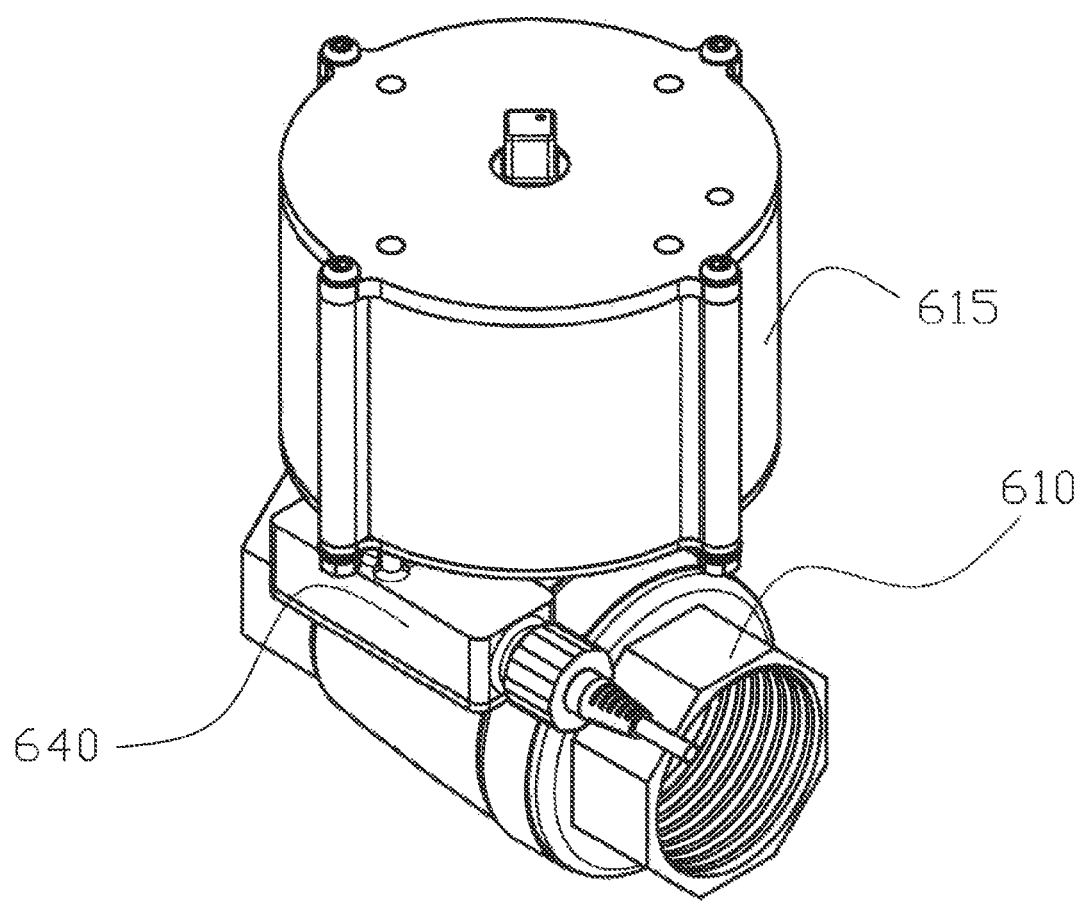
FIG. 30 is a perspective view of a preferred embodiment of an actuating mechanism according to the present invention.

FIG. 30 is a perspective view of an actuating mechanism combined with a valve according to the present invention in accordance with a preferred modification. This embodiment is similar to the embodiment described above, for example illustrated in FIG. 3, and the various components and operation are similar except for as explained below. The primary difference with this embodiment is that the release mechanism, instead of being positioned on the top of the housing, is positioned adjacent to the valve on the bottom of the housing so that the overall valve, combined with the actuator, will have a lower profile. This is advantageous in many situations where space is limited for retrofitting an emergency shutoff mechanism to an existing valve.

FIG. 30 broadly illustrates a valve 610, which may be a ¼ turn valve as discussed above. Actuator 615 is interconnected with the valve, and release mechanism 640 is connected to the underside of the actuator 615.

Looking at FIG. 31, actuator 615 includes a housing 620 that is made up of a top plate 621, a bottom plate 622 and a middle housing portion 623. These components are connected together by bolts as illustrated. A shaft opening 624 is provided near the bottom for a central shaft of the actuator drive 630 to extend through the housing 620. The actuator drive 630 has a valve drive socket 631 for connection to the valve in the same way as described with respect to the earlier embodiment, for example. Similarly, a reset drive 632 is formed at the top of the actuator drive at the top of the housing. Locking insert 634 is provided with the actuator drive 630 so as to rotate therewith. A spring is interconnected with the actuator drive and the housing in the same way as described with respect to the earlier embodiment.

Though the connection is not specifically shown in FIG. 31, the locking insert 634 faces downward for interaction with release mechanism 640 mounted on the underside of bottom plate 622. A suitable aperture and connection arrangement is provided through the bottom plate 622 and the middle housing portion 623 so that a locking ball 641 of the release mechanism 640 can be inserted into the aperture and aligned with locking insert 634 in the same manner as described above. The main difference here is that the locking ball 641 is moved up into locking insert 634 to lock the valve in the open position.

In this embodiment, the release mechanism 640 differs somewhat from the release mechanism of the earlier embodiment. The locking ball 641 and a locking pin 642 are provided inside a locking pin bushing 643 inside a cylinder a roller housing of roller 650. Roller 650 is a designation encompassing both the roller housing and slider 660.

The cylinder extends upward from the roller housing so as to be insertable into the aperture (not shown) of the housing 620. The locking ball 641 and locking pin 642 are biased upwardly by a spring 644. The force of this spring can be overcome by the force of the spring that is interconnected between the housing 620 and the actuator drive 630 when slider 660 is moved to a position that allows the lock pin 642 to move downwardly. Slider housing 661 has slider rollers 663 thereon allowing the slider to roll inside of the roller housing 651. Upon activation of, for example, a seismic sensor, the cable is pulled, as in the previously described embodiment, and the slider 660 is moved toward the right. The slider 660 has a recess 670 therein that allows the lock pin 642 to move downwardly, which downward movement is caused by the pressure of the locking insert 634 on the steel ball 641.

Cable end 666 is connected to slider housing 661 through a backlash mechanism including a backlash spring 667 as illustrated. A slider return spring 669 is also provided to assist the slider 660 to move back into position as illustrated in FIG. 32 when the actuating mechanism is reset to allow the valve to be reset to the open position.

FIG. 33 is a cross-sectional illustration of the locking insert 634, illustrating the angle between the horizontal and the side wall of the locking insert as 107°, which is 17° with respect to vertical.

Figure 34:
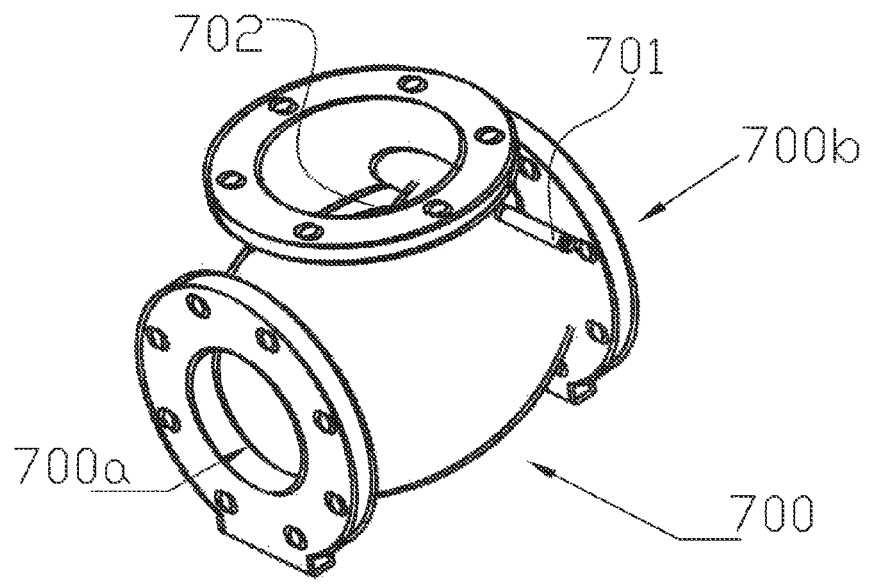
FIG. 34 is a perspective view of a flapper type valve.
Figure 37:
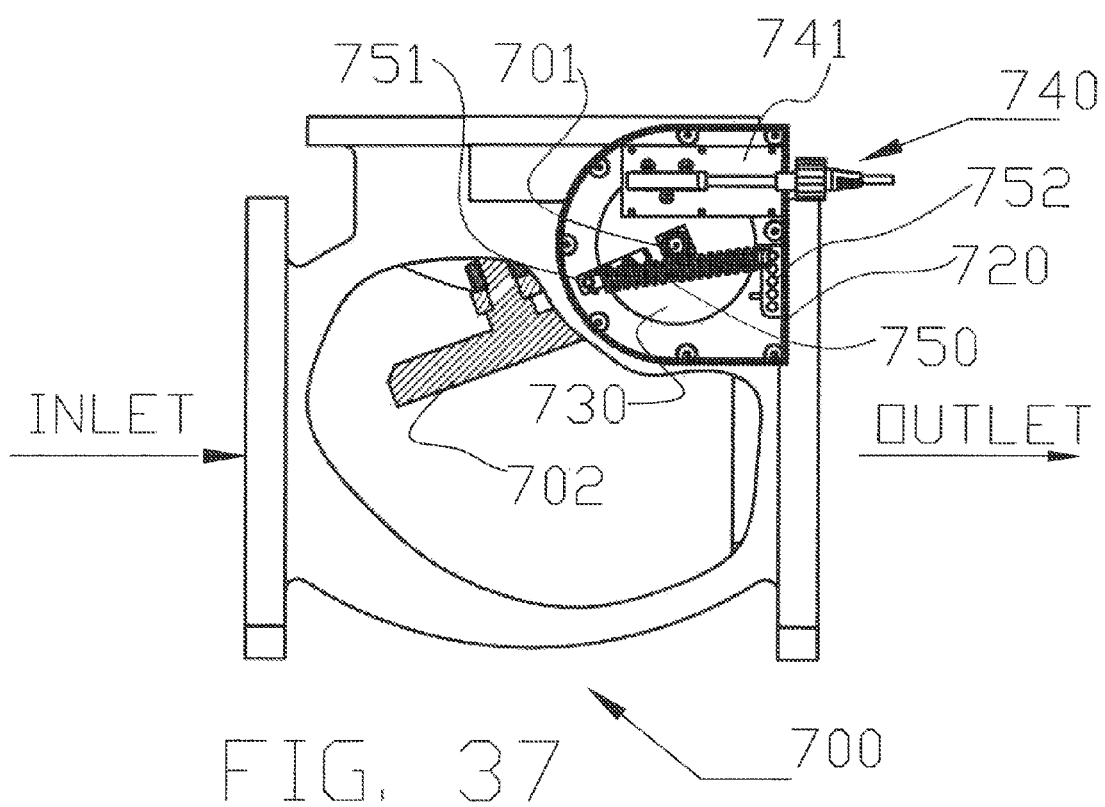
FIG. 37 illustrates the valve and actuating mechanism of FIG. 36 in an open position.

FIG. 34 is a perspective view of a known valve that is a swing check valve or flapper valve. This valve, designated 700, has a valve member 702 (see FIG. 37, for example) that, typically, is carried by a pivoting member connected to an external pivot shaft 701. Flow in this type of valve, as shown between FIGS. 34 and 37, goes from an inlet 700a to an outlet 700b so that fluid pressure tends to force the valve member 702 into its closed position as shown in FIG. 37.

The present inventor has determined that this type of valve, when combined with an actuating mechanism according to the present invention and as discussed above, may be more suitable than the standard ¼ turn check valve for larger applications. Specifically, in situations where the pipe diameter is greater than 2 inches, the size and the forces involved for actuating and resetting the valve member with a ¼ turn check valve make the size of the necessary components becomes large. A smaller and less expensive arrangement can be employed for such larger scale situations by using the swing check valve. Standard valves of this type are available from GA Industries LLC; see e.g. their swing check valve designated GA FIG. 220.

The concept is similar to the actuating mechanism employed with the ¼ turn valve. That is, the valve is held in an opened or locked position and released to close by having an actuating mechanism turn the external shaft 701, or allow the shaft 701 to turn if the valve itself is biased toward closing.

Figure 35:
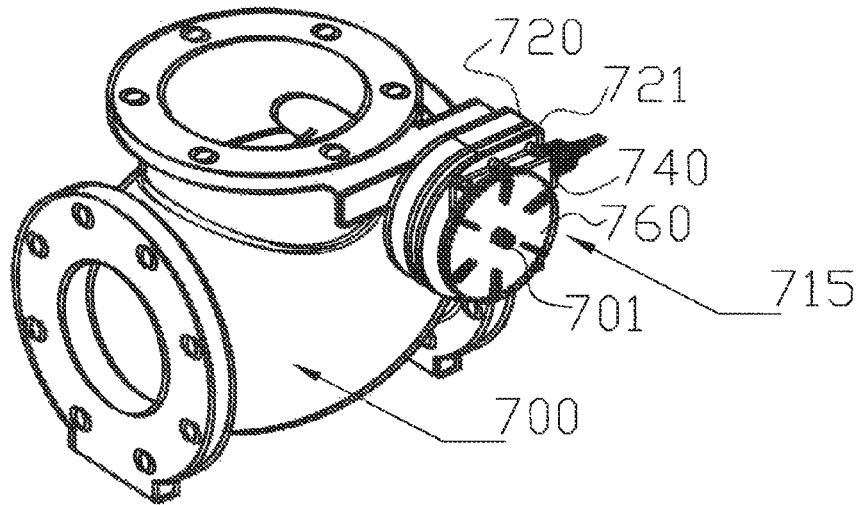
FIG. 35 is a perspective view of an actuating mechanism in accordance with the present invention applied to the flapper type valve of FIG. 34.

Looking at FIG. 35, an actuator 715 is connected to the external shaft 701 of the valve 700. The actuator 715 includes a housing 720 having a cover 721 and a release mechanism 740. A reset member 760 is connected to the end of the external shaft 701 on the outside of the actuator housing 720 so that the valve 700, after having been triggered, can be manually reset.

Figure 36:
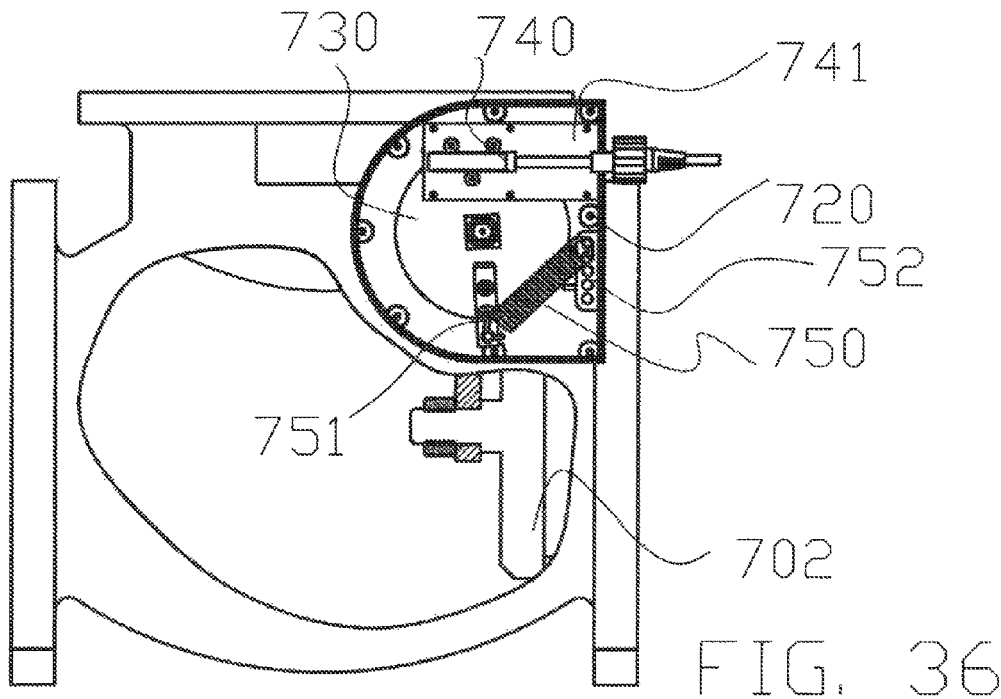
FIG. 36 is a partly cross-sectional view of an actuating mechanism with a flapper type valve of FIG. 35, illustrating the valve in an off position.

FIGS. 36 and 37 are both partial cross-sectional views showing the interior of the valve 700 and the interior of the actuator housing 720. FIG. 37 shows the valve in the open, locked position thereof. In this figure, the release mechanism 740, as illustrated, is laterally mounted with the actuator cable coming from a sensor mechanism from the right side as seen in the figure. As can be seen from FIG. 36, a cover for the release mechanism 740 is provided on the cover 721 of the housing 720. The release mechanism 740 extends inside of the housing 720 so that a locking ball (as described above) thereof can engage a locking insert (also as described above) that is positioned in an actuator drive 730. The release mechanism 740 of this embodiment may, for example, be the same release mechanism as shown in FIG. 32. In this case, however, a locking pin bushing and a cylinder of the slider housing, which house the locking ball and the locking pin, extend horizontally into the page as seen in FIGS. 36 and 37. They are received in a release mechanism mounting plate 741 so that the locking ball can be received in the locking insert mounted in the actuator drive 730.

The actuator drive 730 is mounted on the external shaft 701. The actuator drive 730 is a circular member connected to the external shaft 701 so that rotation of the actuator drive 730 will turn the external shaft. For example, the external shaft 701 could have a square cross section matching with the square hole provided in the actuator drive 730.

A spring 750 is mounted inside of the actuator housing 720 and connected between two spring mounts 751 and 752. Spring mounts 751 is fixed to the actuator drive 730 and extends radially outwardly therefrom. The spring 750 is connected to the end of the mount 751, as illustrated in FIGS. 36 and 37. The spring mount 752 is mounted on the inside of actuator housing 720 with a number of different locations at which the spring can be connected. As can be seen from FIGS. 36 and 37, this allows the spring tension and the pulling angle of the spring to be changed in accordance with the desired conditions.

Figure 38:
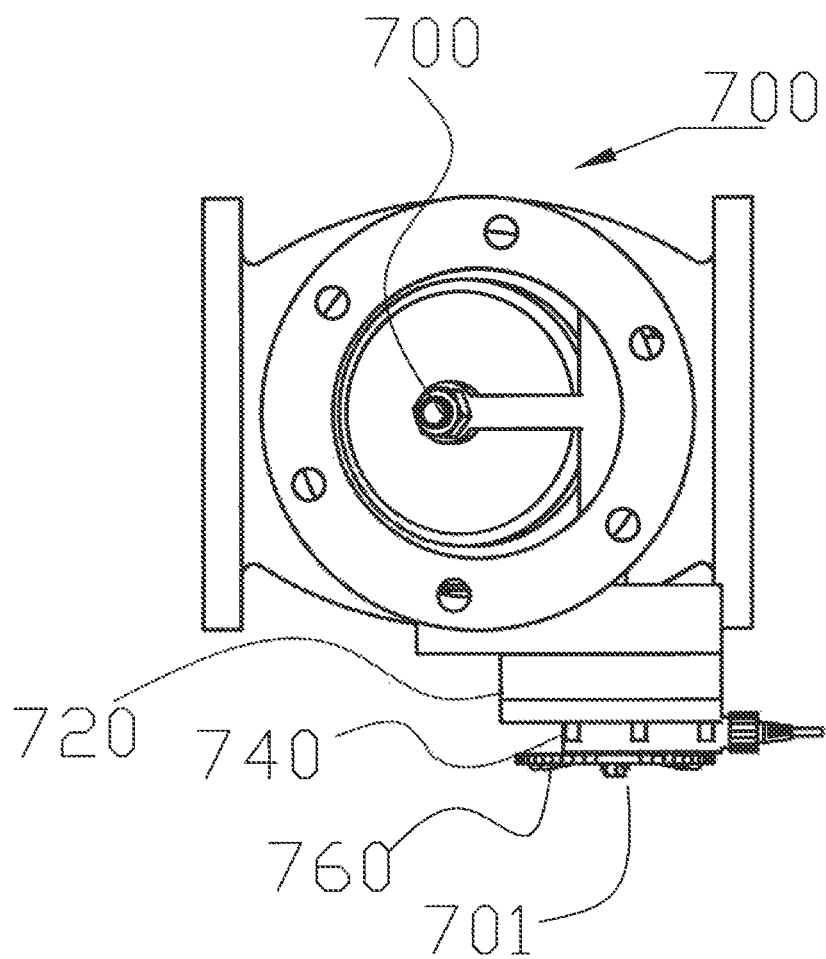
FIG. 38 is a plan view of the embodiment of FIGS. 35-37.

In operation, the locking insert in the actuator drive 730 is lined up with the locking ball of the release mechanism 740, so that the locking ball is in a position so that the actuator drive 730 is held in place, as with the previously described embodiments, under the force of the spring 750. (As with the previous embodiments, the actuator 715 does not require the spring 750 or its corresponding mounts if the valve itself is spring loaded.) As with the other embodiments, when the cable is pulled due to a sensor mechanism being activated, the cable is pulled toward the right and the locking insert causes the locking ball to be pushed away, allowing the actuator drive 730 to rotate under the force of the spring 750. The force of the spring 750 rotates the actuator drive 730, which rotates the external shaft 701, which closes the valve 700. The reset member 760 is manually employed to reset the mechanism. Specifically, the member is turned so that the external shaft is rotated to both open the valve and turn the actuator drive 730 so that the locking insert once again lines up with the locking ball. This allows the locking ball to be pushed into the locking insert and allows the slider of the release mechanism 740 to be moved back into place to hold the locking ball in place. FIG. 38 is a plan view that illustrates the arrangement of the components.

The components of the actuating mechanism according to the present invention may be made by standard materials and assembly techniques known in the art. For example, the components of the actuator mechanism of the embodiments described above, in the case of the actuator drive, the actuator housing, the slider and roller housings, the locking insert, the locking pin, etc. may all be machined metal components suitably welded or bolted together. A number of components, such as the magnets, the steel ball, the rollers, the cable and the springs, are all components that are available off the shelf. Ideally, however, a number of components are molded plastic in order to reduce size, cost and weight. This may include the various housings described above, for example the actuator housing, the sensor housing, the reset arm and manual reset handles.

I claim:

1. An actuating mechanism for actuating a valve, comprising:
    an actuator housing;
    an actuator drive in said housing that is movable relative to said actuator housing between a locked position and an unlocked position, said actuator drive having a valve connection for connecting said actuator drive to a valve;
    a locking surface in said actuator drive;
    a hole in said actuator housing;
    a locking member movable from a first position, in which said locking member is engaged with said locking surface and in said hole so as to hold said actuator drive relative to said actuator housing in said locking position, to a second position, in which said locking member is disengaged with said locking surface such that said actuator drive can move to said unlocked position; and
    a blocking device on said housing movable between one position blocking movement of said locking member from said first position thereof and another position allowing said locking member to move to said second position thereof.

2. The actuating mechanism of claim 1, wherein said actuator housing comprises a valve mount for mounting said actuating mechanism on a mounting flange of a valve and said valve connection comprises a drive socket for connection to a valve stem shaft.

3. The actuating mechanism of claim 1, wherein said actuator drive comprises a rotor mounted in said housing and said actuator valve connection comprises a drive socket for connection to a valve stem.

4. The actuating mechanism of claim 1, wherein said locking member comprises a locking ball and said locking surface comprises an angled surface receiving said locking ball in said first position thereof.

5. The actuating mechanism of claim 4, wherein said angled surface has an angle of 15 to 35 degrees relative to an axis of said hole.

6. The actuating mechanism of claim 5, wherein said angle is 18-20 degrees.

7. The actuating mechanism of claim 4, wherein said hole of said actuator housing is a through hole and said locking member has a locking pin in said through hole adjacent said locking ball.

8. The actuating mechanism of claim 7, wherein said blocking device engages said locking pin when positioned over said through hole and releases said locking pin for movement such that said locking ball can move when unblocking said through hole.

9. The actuating mechanism of claim 8, wherein said blocking device comprises a roller that is connected for rolling movement to a sensor mechanism.

10. The actuating mechanism of claim 9, wherein said sensor mechanism comprises a seismic sensor operable to detect seismic activity and said sensor mechanism is connected to said roller by a cable such that when seismic activity is detected by said sensor mechanism said roller is moved by said cable to said position unblocking said through hole.

11. The actuating mechanism of claim 9, wherein said roller comprises a roller housing on said actuator housing and a slider having a plurality of rollers mounted thereon for rolling movement in said roller housing, and wherein one of said rollers engages said locking pin in said position in which said blocking device blocks said through hole.

12. The actuating mechanism of claim 9, wherein said sensor comprises a sensor housing having a ball track therein, a steel ball, a pedestal for receiving said steel ball and a magnet that is positioned for movement at a location along said ball track remote from said pedestal, said magnet being connected to said cable, such that when said steel ball is on said pedestal and seismic activity causes said steel ball to leave said pedestal, said steel ball moves to a position along said ball track such said magnet is attracted thereto and causes said cable to be pulled.

13. The actuating mechanism of claim 8, wherein said sensor mechanism includes a cable connected between a roller and a movable member.

14. The actuating mechanism of claim 13, wherein said sensor mechanism includes a solenoid, said movable member is a solenoid pin movable by said solenoid, and said solenoid is operably connected to a control system.

15. The actuating mechanism of claim 14, wherein said control system comprises at least one sensor for detecting a safety condition.

16. The actuating mechanism of claim 4, wherein said locking surface is formed by a locking insert mounted in said actuator drive.

17. The actuating mechanism of claim 16, wherein said locking insert has a reset magnet mounted therewith for attracting said locking ball into said aperture when said actuator drive is reset to said locking position and said locking ball is made of steel.

18. The actuating mechanism of claim 1, wherein said blocking device comprises a roller.

19. The actuating mechanism of claim 18, wherein said roller covers said hole of said actuator housing in said one position of said blocking device and uncovers said hole in said another position of said blocking device.

20. The actuating mechanism of claim 18, wherein said locking member comprises a ball that engages said locking surface in said first position of said locking member and that is further inside said hole of said actuator housing in said second position of said locking member than in said first position of said locking member.

21. The actuating mechanism of claim 1, wherein a spring is connected between said actuator housing and said actuator drive such that, when said actuator drive is in said locked position, said spring biases said actuator drive toward said unlocked position.

22. A valve actuating mechanism, comprising:
- an actuator housing;
- an actuator drive in said housing that is movable relative to said actuator housing between a locked position and an unlocked position, said actuator drive having a valve connection;
- a locking surface in said actuator drive;
- a hole in said actuator housing;
- a locking member movable from a first position, in which said locking member is engaged with said locking surface and in said hole so as to hold said actuator drive relative to said actuator housing in said locking position, to a second position, in which said locking member is disengaged with said locking surface such that said actuator drive can move to said unlocked position;
- a blocking device on said housing movable between one position blocking movement of said locking member from said first position thereof and another position allowing said locking member to move to said second position thereof;
- a valve having a valve shaft, said actuator housing being mounted on said valve and said valve connection being connected to said valve stem shaft such that said valve is open in said locked position and closed in said unlocked position; and
- one of (a) a spring connected between said actuator housing and said actuator drive such that, when said actuator drive is in said locked position, said spring biases said actuator drive toward said unlocked position, and (b) a spring in said valve biasing said valve to said closed position.

23. The actuating mechanism of claim 22, wherein said actuator valve connection comprises a drive socket connected to said valve stem shaft.

24. The actuating mechanism of claim 23, wherein said mechanical sensor comprises a sensor housing having a ball track therein for said steel ball and a pedestal for receiving said steel ball in said unactivated position, and wherein said magnet is positioned for movement at a location along said ball track remote from said pedestal such that when said steel ball is on said pedestal and seismic activity causes said steel ball to leave said pedestal, said steel ball moves to a position along said ball track such said magnet is attracted thereto and causes said contact link to move to said activated position.

* * * * *